US009992843B2

(12) United States Patent
Couch et al.

(10) Patent No.: US 9,992,843 B2
(45) Date of Patent: Jun. 5, 2018

(54) LOCATION INDEPENDENT LIGHTING SENSOR SYSTEM

(71) Applicant: Gooee Limited, St Albans (GB)

(72) Inventors: Jonathan Couch, Wilshire (GB); Simon Coombes, St Petersburg, FL (US); Shmuel Silverman, Novato, CA (US)

(73) Assignee: Gooee Limited, St Albans (GB)

( * ) Notice: Subject to any disclaimer, the term of this patent is extended or adjusted under 35 U.S.C. 154(b) by 0 days. days.

(21) Appl. No.: 15/424,868

(22) Filed: Feb. 5, 2017

(65) Prior Publication Data

US 2017/0265268 A1   Sep. 14, 2017

Related U.S. Application Data

(63) Continuation-in-part of application No. 15/360,879, filed on Nov. 23, 2016, now Pat. No. 9,655,197.
(Continued)

(51) Int. Cl.
| | |
|---|---|
| *H04L 29/08* | (2006.01) |
| *H05B 33/08* | (2006.01) |
| *H05B 37/02* | (2006.01) |
| *H04W 4/06* | (2009.01) |
| *H04W 4/02* | (2018.01) |

(52) U.S. Cl.
CPC ......... *H05B 33/0893* (2013.01); *H04L 67/10* (2013.01); *H04W 4/06* (2013.01); *H05B 33/0845* (2013.01); *H05B 33/0851* (2013.01); *H05B 33/0866* (2013.01); *H05B 37/0254* (2013.01); *H04W 4/023* (2013.01)

(58) Field of Classification Search
CPC ............. H05B 33/08; H05B 33/0893; H05B 33/0845; H05B 33/0866; H05B 37/02; H05B 37/0227; H05B 37/0272; H05B 37/0254; H04W 88/16; H04W 4/06; H04W 4/02; H04W 4/023; H04L 29/08; H04L 67/10
See application file for complete search history.

(56) References Cited

U.S. PATENT DOCUMENTS

| | | |
|---|---|---|
| 3,971,065 A | 7/1976 | Bayer |
| 4,245,241 A | 1/1981 | Sato et al. |
(Continued)

FOREIGN PATENT DOCUMENTS

| | | |
|---|---|---|
| DE | 102007043416 A1 | 4/2009 |
| DE | 102012210743 A1 | 1/2014 |
(Continued)

OTHER PUBLICATIONS

International Search Report and Written Opinion of International Application No. PCT/IB2017/051386, p. 2 list of references cited, dated Jun. 6, 2017, 12 pages.
(Continued)

*Primary Examiner* — Thai Pham
(74) *Attorney, Agent, or Firm* — Moyles IP, LLC

(57) ABSTRACT

A system for sensing luminaire properties and controlling luminaire performance independently of the location, distance or orientation of the sensors relative to the source luminaire device that is being sensed. Thus, the installer and the maintenance crew are freed from issues and activities associated with sensor installation.

20 Claims, 15 Drawing Sheets

Related U.S. Application Data

(60) Provisional application No. 62/306,636, filed on Mar. 11, 2016, provisional application No. 62/445,669, filed on Jan. 12, 2017.

(56) References Cited

U.S. PATENT DOCUMENTS

| | | | |
|---|---|---|---|
| 5,770,928 | A | 6/1998 | Chansky |
| 7,248,297 | B2 | 7/2007 | Catrysse et al. |
| 7,893,632 | B2 | 2/2011 | Meijer et al. |
| 7,950,832 | B2 | 5/2011 | Tanaka et al. |
| 8,319,452 | B1 | 11/2012 | Hamel et al. |
| 8,442,785 | B2 | 5/2013 | Walters et al. |
| 8,928,232 | B2 | 1/2015 | Aggarwal et al. |
| 9,131,581 | B1 | 9/2015 | Hsia et al. |
| 9,408,280 | B2 | 8/2016 | Schröder et al. |
| 9,521,733 | B2 | 12/2016 | Brand et al. |
| 9,655,197 | B1 | 5/2017 | Coombes et al. |
| 9,686,842 | B1 | 6/2017 | Coombes et al. |
| 2013/0181636 | A1 | 7/2013 | Agrawal |
| 2013/0193876 | A1* | 8/2013 | Cleland .............. H05B 37/0245 315/297 |
| 2014/0320022 | A1 | 10/2014 | Lee |
| 2014/0375221 | A1 | 12/2014 | Mans et al. |
| 2015/0130365 | A1 | 5/2015 | Kim et al. |
| 2016/0360594 | A1* | 12/2016 | Chemel .............. H05B 37/0227 |
| 2017/0111979 | A1 | 4/2017 | Barna et al. |
| 2017/0270342 | A1 | 9/2017 | He et al. |
| 2017/0330007 | A1 | 11/2017 | Lu et al. |

FOREIGN PATENT DOCUMENTS

| | | |
|---|---|---|
| GB | 2222245 A | 2/1990 |
| GB | 2359616 A | 8/2001 |
| GB | 2489505 A | 10/2012 |
| GB | 2534901 A | 8/2016 |
| WO | WO-2009104135 A1 | 8/2009 |
| WO | WO-2015108489 A1 | 7/2015 |
| WO | WO-2015177762 A2 | 11/2015 |
| WO | WO-2016003672 A1 | 1/2016 |

OTHER PUBLICATIONS

International Search Report and Written Opinion of International Application No. PCT/IB2017/053190, dated May 31, 2017.

Lighting Research Center, Assist: Alliance for Solid-State Illumination Systems and Technologies, Feb. 15, 2005, 2 pages, http://www.lrc.rpi.edu/programs/solidstate/assist/index.asp.

U.S. Department of Energy, LED Measurement Series: LED Luminaire Reliability, Oct. 2009, 4 pages, www.ssl.energy.gov.

Philips, Understanding power LED Lifetime analysis, Technology White Paper, Dec. 5, 2016, 11 pages, www.lrc.rpi.edu/programs/solidstate/assist/index.asp.

Kevin Dowling, PhD, Lumen Maintenance IESNA LM-80-2008, Oct. 30, 2008, 16 pages, www1.eere.energy.gov/buildings/publications/pdfs/ssl/lm80-webcast_10-30-08.pdf.

Jeff McCullough, LC, Pacific NW National Lab, Energy Star® Webinar:Requirements for Lumen Maintenance, Oct. 30, 2008, 18 pages, www1.eere.energy.gov/buildings/publications/pdf.

M-CAM Patently Obvious, Kodak's Final Gasp? Intellectual Property Analysis of Kodak v Apple, HTC, Jan. 13, 2012, 8 pages, http://www.globalinnovationcommons.org.

Claire Swedberg, IoT Lights Up Streets With Smart City Initiative, RFiD Journal, Jul. 23, 2015, 3 pages, http://www.iotjournal.com/articles/view?13303.

DALI, Discover DALI—Excellent System Performance, Product Summary, Mar. 31, 2014, 5 pages, http://dali-ag.org/discover-dali.html.

UK Examination Report of United Kingdom Patent Application No. GB1718616.4, which is in the same family as U.S. Appl. No. 15/785,808, dated Jan. 10, 2018, 7 pgs.

International Search Report of International Application No. PCT/IB2017/057046, which is in the same family as U.S. Appl. No. 15/785,808, dated Feb. 12, 2018, 3 pgs.

International Written Opinion of International Application No. PCT/IB2017/057046, which is in the same family as U.S. Appl. No. 15/785,808, dated Feb. 12, 2018, 8 pgs.

\* cited by examiner

LOCATION INDEPENDENT LIGHTING SENSOR SYSTEM

CROSS-REFERENCE TO RELATED APPLICATIONS

The present application claims priority to U.S. patent application Ser. No. 15/360,879, filed Nov. 23, 2016, entitled Color Based Half-Life Prediction System, which in turn claims the benefit of U.S. Provisional Patent Application No. 62/306,636, entitled Color Based Half-Life Prediction System, filed Mar. 11, 2016, and the benefit of U.S. Provisional Patent Application No. 62/445,669, entitled Location Independent Lighting Sensor System, filed Jan. 12, 2017, the entire disclosures of which are incorporated herein by reference in their entirety for all purposes.

FIELD

A system for sensing luminaire properties and controlling luminaire performance independently of the location, distance or orientation of the sensors relative to the source luminaire device that is being sensed is described herein.

BACKGROUND

Digital lighting technologies based on light-emitting diodes (LEDs) offer a massive improvement in comparison to traditional fluorescent and incandescent lamps. The primary advantages of LED-based luminaires include high energy conversion and optical efficiency, durability, lower operating costs, etc. The massive improvements in LED technologies have displayed efficient and robust full-spectrum lighting sources that achieve a variety of lighting effects in many applications. Some of the luminaires feature a plurality of lighting modules, including a plurality of LEDs, which are capable of generating different colors and color-changing lighting effects.

Today's digitally-based intelligent lighting control systems switch and dim luminaires, as they set up light scenes and manage them in space and time, thus allowing luminaires to be addressed individually and provide great flexibility. Their user-friendly features include easy programming and operations along with a simple installation process. Lighting control systems can be integrated as a subsystem into a building management scheme. A lighting control network consists of one or more lighting devices, e.g., electrical ballasts, LED devices, and dimmers. The dimmers must support specific interfaces to be able to receive control inputs and dim the lights appropriately. Different light devices may support different control interfaces.

LED-based luminaires do not usually fail abruptly like traditional light sources; instead, their light output slowly diminishes over time. Furthermore, LED light sources can have such long lives that life testing and acquiring real application data on long-term reliability becomes problematic—new versions of products are available before the current ones can be fully tested. To add to the challenge, LED light output and useful life are highly dependent on the electrical and thermal conditions that are determined by the luminaire and system design.

Luminaires embedded with LEDs are finding application in every shape and size in varied environments, such as homes, industrial factories, shopping malls, hospitals, office buildings, and so on. The primary reason for the immense popularity of this kind of luminaires is their operational longevity and their reduced power consumption. Lower power consumption helps people reduce their electric bills to a massive extent. Due to this, the technological advancement of these kind of luminaires has soared to new heights.

Smart luminaires embedded with LEDs also include a plurality of sensors, which may include daylight sensors, various kinds of field strength sensors used to sense electrical and magnetic fields, temperature sensors, motion sensors, light sensors, proximity sensors and so on. Smart lighting fixtures have been designed that additionally or alternatively implement intelligent lighting control systems in order to achieve energy savings. Each sensor has its own individual goals and responsibilities. To explain this with one example, some luminaires include daylight sensors and motion detectors. Each luminaire only illuminates when the ambient light level, as measured by the daylight sensor, is below a certain level, and this can be combined with a detected motion.

Existing technology discloses techniques to sense magnitudes of lumen depreciations in a number of ways. These systems sense a lumen depreciation of part of any lighting fixtures, but they also sense the relative light level external to the lighting fixtures. These systems are capable of not only deriving lumen depreciation levels of the luminaires but also the total lumen depreciation levels of the lighting fixtures. These systems typically are comprised of sensors positioned outside of the lighting fixtures, and comparators to determine measured actual lumen output signals from the sensors to pre-set references or threshold lumen output values. Error signals are generated by the comparators if it is disclosed that the actual lumen output has gone below the reference or threshold lumen output levels. In these systems, the sensor location relative to the luminaire is an important factor. In addition, the sensor calibration that is based on the specific luminaire and environment is critical to accurate measurement of lumen levels. It would instead be desirable to provide a sensor system that could be continuously operated even if the sensor is moved relative to the luminaire over the life of the luminaire. It would also be desirable to provide a sensor system that can be automatically recalibrated if the specific luminaire in use is replaced.

Another existing technology provides techniques to control individual LEDs in LED-based illumination devices so that a desired level of luminous flux and desired chromaticity of the illumination devices can be maintained over any fluctuations in drive currents and temperatures. The illumination devices include a plurality of emission LEDs, a storage medium, an LED driver, a receiver circuit, and a control circuit. The storage medium maintains a table of calibration values correlating forward voltage and drive currents to chromaticity and luminous flux at a variety of temperatures for each of the emission LEDs. The LED driver and receiver circuit provide respective drive currents to the emission LEDs to produce continuous illuminations, and periodically turn the emission LEDs off to calculate operating forward voltages that develop across each emission LED. The control circuit determines whether a target luminance setting or a target chromaticity setting for the illumination device has changed, and, if so, determines new respective drive currents needed to achieve the target luminance setting and the target chromaticity setting using the operating forward voltages measured across each emission LED, the table of calibration values, and one or more interpolation techniques.

Another existing technology provides techniques to monitor the health of LED-based lights. These techniques describe the received data regarding LED junction temperatures, ambient temperatures, and drive currents associated with the LEDs, receiving pre-existing LED performance data sets. They determined the end of life of the LEDs based on the junction temperatures of the LEDs, the ambient temperatures, the drive currents associated with the LEDs, and the pre-existing LED performance data sets.

However, the largest drawback associated with existing systems is that the positions of the sensors are fixed, i.e., their locations are not changeable. In all the above existing systems, the sensor must be pre-calibrated prior to use. Therefore, any change in the sensor location (relative to the luminaire position) or replacement of the luminaire type itself requires calibration information to be supplied (from the manufacturer) for the new system to be set up. Plainly, if the locations of the sensors are changed relative to the luminaires that they are sensing, then none of the above disclosed systems will be able to function in an appropriate manner. Rather, they would all need to be re-calibrated first, which can be extremely time consuming to do. What is needed is a system and method that frees an installer and/or maintenance crew from issues and activities associated with sensor installation and recalibration.

Due to the large variety of luminaries and the rapid introduction of new luminaire architecture and designs, there is a need for a system and a method that is capable of working with any type of luminaire while being able to control the luminaire with sensor readings even if the position of the sensor(s) is changed with respect to the luminaire, or if the luminaire itself has been changed.

BRIEF DESCRIPTION

In accordance with the present system, a variety of sensors are included into a smart lighting system that automatically recalibrates sensor readings upon a change in the position of the sensor(s) relative to the luminaire, or upon a change in the luminaire itself. The present sensor systems can be part of a sensor platform that is ideally used with LED-based luminaires in a smart lighting environment. Upon a location change of the sensor(s), the system controls lighting by automatically recalibrating the sensors. As such, system integrity is maintained across sensor installation and location changes.

Embodiments of the present system may comprise a plurality of LEDs and/or electronic ballasts ("luminaires"), each of which are connected to one or more sensors ("sensors"). The sensors may be connected to a control and communication device or to a plurality of control and communication devices—Universal Smart Lighting Gateway ("USLG" or "Gateway") which controls the dimming level of the luminaires and is capable of communicating the sensors' readings and the dimming level as well as the power reading of the luminaire over wired/wireless networks and via Wide Area Network ("WAN") to cloud servers for processing.

The present system may provide a sensor or combination of sensors that can measure multiple color channels (such as a "color sensor" that directly faces the luminaires) as well as a low resolution imaging sensor (which could be an array of sensors combined into a low resolution imaging device). Such a color sensor can be used to measure both the color content of a light source and color intensity. Optionally, the color sensor can sense a single color or a plurality of colors. The present system may also include a single ASIC functioning as an imaging ("environment") sensor for monitoring the environment of the light source. Optionally, such an environment sensor can include three (or more) different sensors including but not limited to: a low-resolution image sensor, an ambient light sensor, and a temperature sensor. Without limitation, the present disclosure is referring to the three sensors included in the environment sensor as "environment sensor". Further, without limitations, the environment sensor may include less or more sensors than are described here; and it is to be understood that the present environment sensor can include a combination of sensors that measure the environment, as described in this disclosure. Embodiments in accordance with the present system can also use other sensors and more types of sensors to characterize the environment. In all cases, the present disclosure refers to these combinations of sensors as "environment sensor". It is to be understood that both the color sensor and the environment sensor hardware as described herein can be commonly found existing sensors. Importantly, however, the novel setup and dynamic tuning of these sensors and the information they provide and how this information is acted upon forms part of the present novel disclosure.

Embodiments in accordance with the present system can include the combination of the two sensors (the environment sensor and the color sensor). The present sensor system can optionally be set into a single ASIC or be a set of separate devices, all of which are also connected to the USLG. The sensors convey real time measurements and assessments to the USLG. In an embodiment, the color sensor faces the incoming light from the luminaire and the environment sensor faces the opposite direction, i.e., away from the luminaire. However, other positions are also contemplated, all keeping within the scope of the present system. Both sensors provide measurements that are relative to their location and orientation relative to the luminaire.

The present USLG may interface with other control systems or devices via wired connections, Ethernet connections, wireless connections or any combination thereof, and can receive control messages that direct the USLG to change the dimming level via its dimming interface. This interface or plurality of interfaces is described herein as the backend interface of the gateway ("backend interface"). The protocol used in this interface is described herein as the backend protocol. Embodiments in accordance with the present system have a backend protocol that is capable of delivering dimming directions to the USLG as well as receiving sensor and power level readings from the USLG associated with the monitored/managed luminaires by this USLG.

The present USLG is capable of communicating and handling a plurality of dimming protocols via a dimming control interface. The protocols include, but are not limited to, 0V-10V, 1V-10V, DALI and DMX, and both digital and analog protocols and interfaces are included. Embodiments in accordance with the present system do not limit the type of hardware/wire/bus interfaces between the USLG and the dimming device, e.g., the number of wires, the type of wires or bus connectors. Rather, the connections can be as simple as analog interface control wires and/or electrical/digital bus connectors, of any kind.

The present USLG is capable of communicating and handling a plurality of sensors and sensor protocols via its sensors' interface. Embodiments contemplated by the present system do not limit the type of hardware/wire/bus interfaces between the USLG and the sensor devices, e.g., the number of wires, the type of wires or bus connectors. The connections can be as simple as analog interface connectors and/or electrical/digital bus connectors of any kind.

The present USLG can control the dimming device and change the dimming level and the color temperature of the luminaire (albeit only in luminaire devices that allow for color temperature controls). In an embodiment, the USLG can receive a set of directives for dimming setup and sensor measurements to occur at a specific day and time and/or on a specific schedule that repeats itself. In an embodiment, the sensors can be programmed via the USLG such that they will provide event information data only in cases where the color intensity is outside a predefined range. In an embodiment, the USLG can be controlled such that it executes measurements only when environment measurements are in a certain range, as well as when the dimming level is in a certain range. Therefore, in an embodiment, the dimming parameters, the environmental reading parameters and the sensor parameters and reading setup, can all be controlled from outside of the USLG via cloud sensors connecting to the USLG. A person of ordinary skill in the art will appreciate the fact that the control that is described here allows the system to set up a miniature-controlled environment in which the color intensity of a luminaire can be measured.

In embodiments, a power meter can be included. The power meter can be connected to the input line of the luminaire in such a way that it can measure the electrical power drawn by the luminaire at any given moment in real-time. For example, this power meter can be connected to the gateway to provide real-time power measurements correlated 1-1 to the luminaire power drawn at any given moment. The interface between the gateway and the power meter can optionally be a Universal Asynchronous Receiver/Transmitter (UART) or other communication interface. The interface between the power meter device and the luminaire depends on the type of power meter used. Since this is well-known technology, a person of ordinary skill in the art will appreciate the know-how associated with power meter connections.

The USLG may continuously receive real-time performance measurements from the sensor devices via the sensor interface and power measurements from the power meter via the power meter interface. The USLG may send these readings in a compressed format to the cloud servers. The compressed format may include two types of messages: (a) a baseline message set ("baseline message set") that includes the full sensor readings, power level readings and current dimming state; or (b) an updates message set ("updates message set") that includes changes or differentiations from the previous message set, where a message set can be a baseline message set or any of the updates message set. The baseline message set is sent upon major change, such as a change in the dimming level. The updates message set is sent at regular intervals. The updates message set includes readings that are significantly different from the previous set. In one embodiment, sensor readings can be averaged over the time interval between two consequent updates message sets.

Optionally, the present system includes cloud servers that are continuously receiving performance measurements from a plurality of USLGs. These cloud servers perform correlations between the received information and the specific LED luminaires, which are controlled by these USLGs, and derive an expected lumen life expectancy prediction graph. The life expectancy prediction is based on the lumen prediction graph that is the theoretical lumen degradation prediction graph in ideal known conditions developed by the LED manufacturer and the USLG measurements. Using these correlated information embodiments in accordance with the present system can more accurately predict L70 and L50 for the specific luminaire in its current environment.

In one embodiment the cloud servers provide every USLG with a table of reading directions that includes the correct sensor reading thresholds for specific dimming levels associated with the specific luminaire. The USLG is reporting changes or deviations from this internal table to the cloud servers. Using this method, the system further reduces the amount of information that needs to be transmitted over the USLG backhaul. In this way the cloud server applications can control the rate of information sent by the USLG and more accurately predict the LED behavior.

In embodiments, a color sensor provides continuous measurements of a plurality of color channels. In an embodiment these color channels can be Blue, Yellow and Green channels. In other embodiments the color channels can be Red, Green and Blue channels. These measurements are specific to the color sensor and its design, such that different color sensors may provide different color intensity readings, yet the sensor readings will depreciate at the same rate relative to the said color sensor. In an embodiment, the process of calibration of the sensor is such that the depreciation of a sensor follows a known graph, which was studied for the specific color sensor, in an embodiment a complementary metal-oxide semiconductor (CMOS). In an embodiment, the sensor readings are normalized by its previous readings, such that only the normalized change in reading is significant. Color sensors do not differ from one another in any significant way after normalization of the readings, e.g., so, taking two different color sensors CMOS that are attached to the same luminaire in different physical attachment locations on the fitting, different absolute Red, Green, Blue and Yellow intensity readings will be expected to be received when compared between the two sensors, yet the normalized values read by the individual sensor of the % change in color intensity will have a very close, negligible difference. Red intensity may be read, for instance, as x1 and y1 at time t1 from the two sensors. At t2, x2 and y2 are read respectively. Then, $x2/x1=y2/y1+w$ where $w \ll 1$ (e.g., where w is very small). Embodiments in accordance with the present disclosure allow for an exponential relationship between color intensity measurements and lumen intensity of the LED. This relationship is known/calculated by the cloud server.

In embodiments, one or more sensors are connected to the group of luminaires and sense information associated with them. When the system initializes, a sensor entry calibration point is measured. Using a controlled dimming level, the system can identify, based on several readings, the relative level of measurement experienced by the specific sensor for each sensor in the system. This entry point is the basis for calibration. Large deviations from the basic expected sensor behavior (measurements), which may occur in the future, will indicate change in the sensor location or in the luminaire and will activate a recalibration of the sensor to a new measured level.

In embodiments, the environment and color sensors are placed or connected onto the fitting of the luminaire. The exact location of the sensors is not fixed, e.g., two different luminaires by the same manufacturer of the same type of fitting and LED specifications can be assembled such that the sensors' location is different relative to the surface and dimensions of the fitting. The present system does not limit the location of the color and environment sensors on the fitting. As a result, the impact of the placement of the color and environment sensors on the fitting is mitigated by the present system.

According to an aspect, a multi-point measurement of color intensity over time can be used to differentiate between LED replacement and sensor relocation. The present system may employ a method that is looking for LED expected behavior in the first several 1000 hours of the LED life. It uses known expected behavior as an indicator for newly installed LEDs to differentiate from sensor relocation that causes increases in color intensity measurements. It also may provide a system that is aware of the base time for an LED for every LED and luminaire in the system and uses this base to learn and calibrate the sensor measurements associated with said luminaire. Specifically, a new luminaire will typically increase in luminosity in its first 100 hours, and then later begin to decrease in luminosity. The present system can detect the continual increase in luminosity that is found at the beginning of the life of a new luminaire and thus deduct that a new luminaire has been installed.

The present invention may continuously monitor every luminaire in the system. The measurements are correlated to the baseline measurement and aligned with prediction graph for lumen depreciation over time. The graph is specific to the luminaire and the currently installed environment. When a measurement is deviating from the expected by large number (which can be set by the operator of the system), the server will first try to calibrate the baseline into a new baseline assuming that the sensor location had been changed. After calibration two type of measurements are possible. If the color intensity measurement increases that means that the luminaire is a new one and the system will wait to identify the first 1000 hours point before being able to measure depreciating values. If the measurements are of decreasing values over time the system will compare the new generated graph slope with the previously measured one. If the slope is different and the operator will be alerted to a possible issue with either sensor misplacement or a new luminaire type being installed and but not reported.

In embodiments the present system compares a large sample of same sensors attached to the same luminaire types and statistically identifies common baseline measurements and calibrates the sensors across the entire system. Using this baseline, it can track any deviations in order to identify change in sensor location/orientation relative to the luminaire.

Embodiments in accordance with the present system provides a system for predictive analytics that is not impacted by sensor location changes due to the process of recalibration and the ability to identify such change for every sensor in the system.

These and other advantages will be apparent from the present application of the embodiments described herein.

The preceding is a simplified summary to provide an understanding of some aspects of embodiments of the present disclosure. This summary is neither an extensive nor exhaustive overview of the present disclosure and its various embodiments. The summary presents selected concepts of the embodiments of the present disclosure in a simplified form as an introduction to the more detailed description presented below. As will be appreciated, other embodiments of the present disclosure are possible utilizing, alone or in combination, one or more of the features set forth above or described in detail below.

BRIEF DESCRIPTION OF THE DRAWINGS

The above and still further features and advantages of embodiments of the present disclosure will become apparent upon consideration of the following detailed description of embodiments thereof, especially when taken in conjunction with the accompanying drawings, and wherein.

Figure 1:
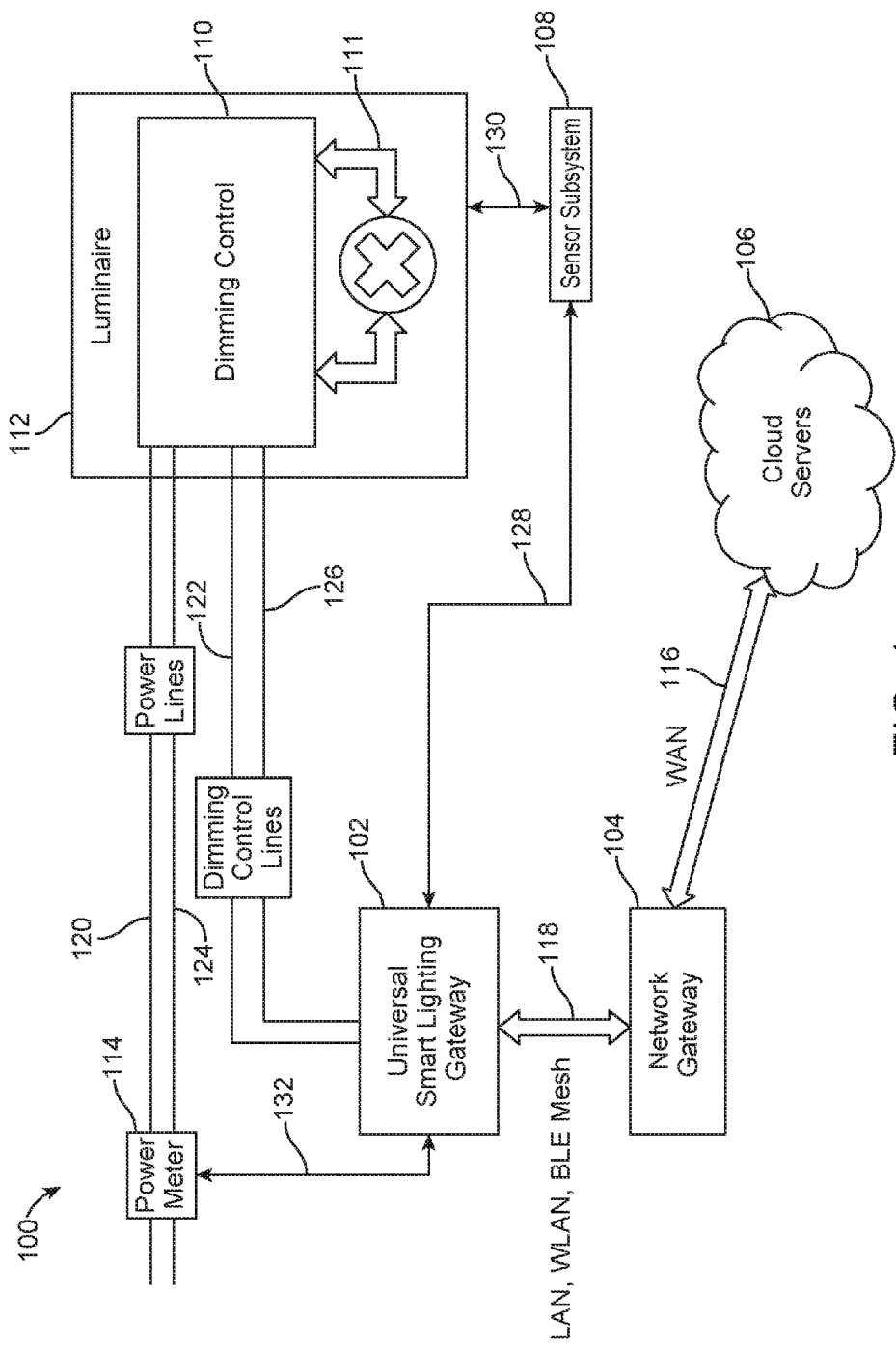
FIG. 1 illustrates a high-level system diagram of a universal gateway system for controlling dimming of a luminaire.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to be used to limit the scope of the description or the claims. To facilitate understanding, reference numerals have been used, where possible, to designate like elements common to the figures.

DETAILED DESCRIPTION

Embodiments of the present disclosure relate generally to a system and method for initialization and automatic re-calibration of a sensor subsystem associated with luminaries, such that measurements taken by the sensor subsystem are independent of the sensor(s) physical location of installation relative to the luminaire. The present system and method may use correlated predicted life expectancy of a plurality of lighting devices to detect that there has been a change in the sensor used, a change in the sensor installation position or a replacement of the luminaire itself, and thereby trigger new sensor calibration. Embodiments of the present disclosure will be illustrated below in conjunction with the figures.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Further, while reference is made to various types of databases, it will be understood by one of ordinary skill in the art that all of the database functions may be stored within compartments of a single database, or within individual databases. In any event, the disclosure is considered to include a tangible storage medium or distribution medium and prior art-recognized equivalents and successor media, in which the software implementations of the present disclosure are stored.

According to an aspect and with reference to FIG. 1, a system 100 for predicting life expectancy and controlling operation of a plurality of luminaires 112 is described. The plurality of luminaires 112 may include at least one light source, which may include a plurality of Light Emitting Diode (LED) devices 111, and a dimming controller device or driver or interface 110. The luminaire 112 is connected to one or more sensors found in at least one sensor subsystem 108. The sensors may be connected to at least one gateway 102, which is a device configured to control and communicate with the luminaire 112. The system 100 includes the at least one gateway 102, which in an embodiment is a protocol agnostic gateway and/or a Universal Smart Lighting Gateway (USLG), at least one power meter 114, and at least one cloud server 106.

The gateway 102 may be capable of detecting, communicating and handling/controlling a plurality of dimming protocols via the dimming control device 110 to provide a plurality of dimming levels to the luminaires 112. The gateway 102 is configured to receive information related the current dimming level of the luminaires 112. The dimming protocols include, but are not limited to, 0V-10V, 1V-10V, DALI and DMX. According to an aspect, both digital and analog protocols and interfaces are included. Embodiments in accordance with the present disclosure do not limit the type of hardware/wire/bus interfaces between the gateway 102 and the dimming device 110, e.g., the number of wires, the type of wires or bus connectors. The dimming control lines 122, 126 connections may be analog interface control wires and/or electrical/digital bus connectors, of any kind.

In an embodiment, the luminaire 112 may include a single luminaire or multiple luminaires connected with a single common interface to power lines 120, 124 and to dimming control lines 122, 126. According to an aspect, a power meter 114 may be connected electrically between the gateway 102 and the luminaire 112 and may be connected electrically to the luminaire 112 via the power lines 120, 124. The power meter 114 may be connected to the gateway 102 via a power meter interface 132. The power meter 114 connections are described in further detail hereinbelow, with reference to FIG. 2.

The power meter 114 may be connected to an input line of the luminaire 112 (see FIG. 1), in such a way that the power meter 114 measures electrical power drawn by the luminaire 112 at any given moment in real-time. According to an aspect, the power meter 114 is connected to the gateway 102 to provide real-time power measurements correlated 1-1 to luminaire power drawn at any given moment. The interface 132 between the gateway 102 and the power meter 114 may be a Universal Asynchronous Receiver/Transmitter (UART) or other communication interface. The particular power lines 120, 124 between the power meter device 114 and the luminaire 112 may depend on the type of power meter 114 being used.

As illustrated in FIG. 1, system 100 includes at least one sensor subsystem 108 that detects current conditions of at least one of the luminaires 112. The sensor subsystem 108 may include at least a first sensor to detect the color intensity and a second sensor to detect at least one change in the environmental condition in luminaire 112. Thus, the current conditions of the luminaires 112 can be detected with the sensors such that the current color level or intensity, the current temperature or voltage or humidity or the current dimming level can be measured. This current condition information can be relayed to the gateway 102 which relays this information to the server 106 for storage, processing and the like. As such, sensor subsystem 108 can be used to sense/detect a plurality of color channels and monitor at least one change in environmental condition in real time. The information collected by the gateway 102 can include the current power level of the luminaires 112 as measured by the power meter 114. The sensor subsystem 108 may be arranged such that it connects via connection 130 to the luminaire 112 on one side and to the gateway 102 via a sensor interface 128 on the other side. The location of placement of the sensors in sensor subsystem 108 may be different for various types of sensors.

The gateway 102 is capable of communicating and handling the plurality of sensors and sensor protocols via its sensor interface 128. Embodiments in accordance with the present disclosure do not limit the type of hardware/wire/bus interfaces between the gateway 102 and the sensor subsystem 108, e.g., the number of wires, the type of wires or bus connectors. The connections can be as simple as analog interface connectors and/or electrical/digital bus connectors of any kind.

In aspects, the sensor or combination of sensors in sensor subsystem 108 may include a "color sensor" that measures multiple color channels, and is positioned directly facing the luminaires, and may also include an "environment sensor" that may be a low resolution imaging sensor or array of sensors or a single ASIC. The color sensor may be used to measure both the color content of a light source and the color intensity. The color sensor can optionally be based on a single color or a plurality of colors.

The environment sensor is used for monitoring the environment of the light source. The environment sensor may optionally include three or more different sensors, such as a low-resolution image sensor, an ambient light sensor, and a temperature sensor. Other sensors and different types of sensors can be used as well, all keeping within the scope of the present system.

The sensors may be directed as follows: the color sensor faces the luminaires, and the environment sensor faces away from the luminaires in such a way that it monitors the environment. Real time measurements and assessments may be conveyed to the gateway 102 by the sensors that make up the sensor subsystem 108.

In aspects, gateway 102 can control the dimming device 110 and thereby change the dimming level and the color temperature of the luminaire 112 (in luminaire devices that allow for color temperature controls). In a method of operation, gateway 102 receives a set of directives or instructions for dimming setup and sensor measurements to occur at a specific day and time and/or on a specific schedule that repeats itself. Such information may be stored in a scheduling database. (See, for instance, FIG. 5 regarding the Dimming and Testing Schedule Database 524.) Server 106 may access the scheduling database and transmit a scheduling message to record the current dimming level and to detect the current conditions of the luminaires 112 by the sensor subsystem 108. According to an aspect, the sensors of the sensor subsystem 108 can be programmed via the gateway 102 such that they will provide event information leading to sensor recalibration only in cases where the color intensity is outside a predefined range. In a method of operation, gateway 102 may control the luminaire such that the gateway reads the environmental sensor information only when the environment measurements are within a certain range, as well as when the dimming level is within a certain range. Should the sensor measurements fall outside of these expected ranges, then the server 106 can calculate new expected sensor ranges in which the gateway controls luminaire operation. Dimming parameters, environmental reading parameters, sensor parameters and reading setup may all be controlled from outside of the gateway 102 via cloud sensors 106.

The environment and color sensors of sensor subsystem 108 may be placed/connected onto a fitting on luminaire 112. Unfortunately, the exact position of these sensors relative to the luminaire 112 is not exactly known. This is because two different luminaires made by the same manufacturer with the same type of fittings and LED specifications may be assembled such that the sensor location is different relative to the surface and dimensions of the luminaire fitting.

In aspects, the color sensor provides continuous measurements of a plurality of color channels. These color channels can optionally be Blue, Yellow and Green channels; or Red, Green and Blue channels. The measurements taken may be specific to the color sensor and its design, such that different color sensors may provide different color intensity readings. Sensor readings for color sensors are expected to depreciate at a rate that follows a known graph which was studied for the specific color sensor CMOS. In a method of operation, the sensor readings are therefore normalized, such that only the normalized change in reading is significant and is detected by the cloud server. Changes in color sensor readings do not differ from one another in any significant way after normalization of the readings. For example, given two different color sensors CMOS that are attached to the same luminaire in different physical attachment locations on the luminaire fitting, different absolute Red, Green, Blue and Yellow intensity readings may be expected to be received when compared between the two sensors, yet the normalized values read by the individual sensor of the % change in color intensity will have a very close, negligible difference. For instance, the Red intensity may be read as x1 and y1 at time t1 from the two sensors. At t2, x2 and y2 may be read respectively. Then, $x2/x1=y2/y1+w$ where $w\ll 1$ (for example, where w is very small). Embodiments in accordance with the present system allow for an exponential relationship between color intensity measurements and lumen intensity of the LED. This relationship is known/calculated by the cloud server.

The system 100 may continuously receive real-time performance measurements from the sensor devices of the sensor subsystem 108 via the sensor interface 128 and power measurements from the power meter 114 via the power meter interface 132. The gateway 102 may send these sensor and power readings in a compressed format to the cloud servers 106 for processing, storage, calculating, compilation, comparing, and the like. Server 106 may include a processor configured to receive and use the information to calculate and predict the life expectancy of the luminaires and to generate and relay a life expectancy report to a user. The compressed format may include two types of messages, namely a baseline message set and an updates message set as will be discussed in greater detail hereinbelow with reference to FIG. 4. The baseline message set may include the full sensor readings, power level readings and current dimming state. The updates message set may include changes or differentiations from the previous message set. In aspects, the baseline message may be sent when major changes occur (such as a change in the dimming level), whereas the updates message set may be sent at regular intervals. According to another aspect, the updates message set includes readings that are significantly different from the previous set. According to one method of operation, sensor readings can be averaged over the time interval between two consequent updates message sets.

The system 100 may include a backhaul interface 118 for connecting the gateway 102 and a network gateway 104. The backhaul interface 118 may be a wired or wireless Local Area Network (LAN), including one or more of Mesh Bluetooth Low Energy (Mesh BLE), Smart Mesh, Bluetooth Mesh, WLAN, ZigBee, and/or Ethernet LAN. In an embodiment, the backhaul interface 118 is a Mesh BLE. The communication protocol may include the Mesh BLE. The gateway 102 may thus be connected to the back-end network gateway 104 via LAN, WLAN, WAN, Mesh BLE radio network or other means. This connection may allow another device on the network local to the gateway or via WAN in the cloud, to handle the lumen prediction process. Thus, the entire luminaire half-life prediction process can be distributed between physical machines or on a single machine, local or remote to the gateway 102 itself.

Gateway 102 can interface with other control systems or devices via wired connections, Ethernet connections, wireless connections or any combination thereof, and can receive control messages that direct the gateway 102 to change the dimming level via its dimming interface/control/driver 110. Embodiments in accordance with the present system provide a system in which the backhaul protocol (i.e.: the protocol used in interface 118) is capable of delivering dimming directions to the gateway 102 as well as receiving sensor and power level readings via the sensor subsystem 108 from the gateway 102 associated with the monitored/managed luminaires 112.

The gateway 102 may be connected to the network gateway 104, which resides between the local networks to a wide area network (WAN) 116. The WAN 116 connects the gateway 102 to cloud computers/servers 106 for operational and management interfaces.

As described in greater detail in commonly owned U.S. patent application Ser. No. 15/344,263, filed Nov. 4, 2016, ("the '263 application"), which is incorporated herein by reference in its entirety, system 100 may facilitate dynamic discovery of a dimming protocol that runs over the dimming control lines 122, 126. The server 106 may calculate and predict depreciation of the dimming levels of the plurality of luminaires 112. According to an aspect, the server 106 is configured to report the current prediction via a plurality of user reporting mechanisms, including a real time display of status and prediction information associated with the plurality of luminaires 112.

In one embodiment, the cloud servers 106 provide each gateway 102 with a table of reading directions that includes the correct sensor reading thresholds for specific dimming levels associated with the specific luminaire 112. The gateway 102 may report changes or deviations from this internal table to the cloud servers 106. Using this method, the system 100 may further reduce the amount of information that needs to be transmitted over the gateway 102 backhaul interface 118. In this way, the cloud server applications can control the rate of information sent by the gateway 102 and more accurately predict the LED 111 behavior.

System 100 may send sensor readings and other information over the backhaul interface 118 to the cloud server 106 at random times. According to an aspect, this allows for better utilization of the backhaul interface 118, which may be a wireless mesh network with limited backhaul capacity. In an embodiment, a message being sent at random time periods during the day will include a correct time stamp of the reading and the dimming level. The message receiving time at the cloud server is not the measurements' time, thus tagging the measurement correctly with time of measurement may be required.

The cloud server 106 performs correlations between received information and the specific LEDs 111/luminaires 112, which are controlled by gateways 102, and derive an expected lumen prediction graph. The prediction graph may be based on the lumen prediction graph, that is, the theoretical lumen degradation prediction graph in ideal known conditions developed by the LED manufacturer, (and stored in a Driver Manufacturers database (DB) 820, as discussed in greater detail hereinbelow with reference to FIG. 8), and the measurements acquired through the sensor subsystem 108, the power meter 114 and/or the dimming level set by the dimming control device 110. Thus, the real-time measurements are compared/correlated to the predicted or manufacturer's life (end of life and/or half-life) graph to establish an actual graph of what the specific luminaires 112 are experiencing in actuality. Thus, a solution that allows users/customers to more accurately predict when sufficient lumen degradation has occurred such that action needs to be taken to replace the light source is provided. Using this correlated information, the system can more accurately predict $L_{70}$ and $L_{50}$ for the specific luminaire in its current environment. According to an aspect, the dimming and/or testing schedule is updated based on differences detected between current information received/collected and previous information that had been received/collected previously.

Figure 2:
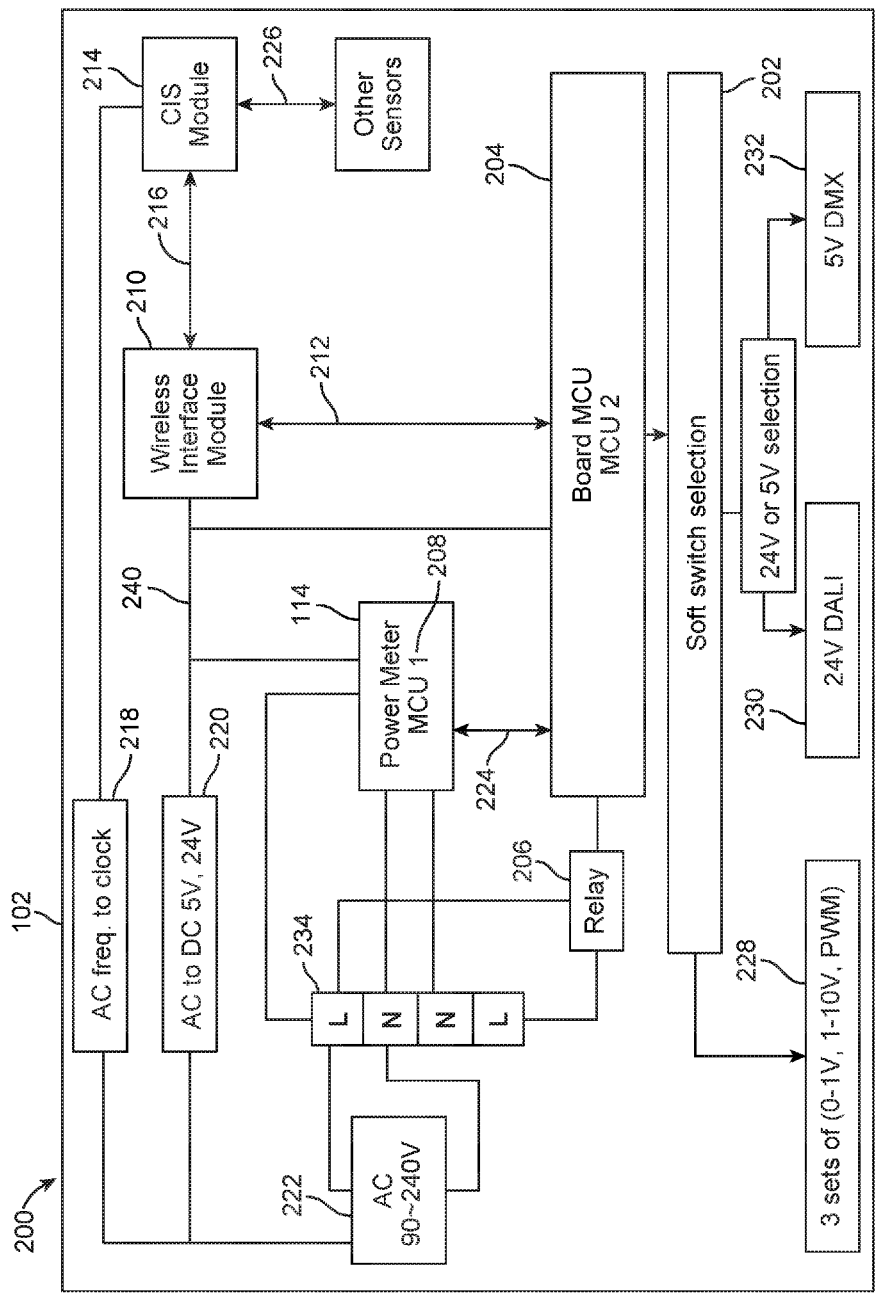
FIG. 2 illustrates an exemplary gateway box diagram.

FIG. 2 depicts the gateway 102 in further detail. According to an aspect, a soft switch 202 to select between different electrical dimming interfaces is provided. The soft switch 202 may be actively used to search for the correct protocol between the gateway 102 and the luminaire 112 (not shown in this figure). The luminaire 112 may be a dimming luminaire. According to an aspect, protocol modules 228, 230, and 232 are the software implementation of the dimming interfaces that reside in the gateway 102. In an embodiment, the supported dimming protocol includes several sets of protocols, such as, for example, 0V-10V, 1V-10V, PWM 228 protocols over 0V-10V and/or 1V to 10V, a 24V DALI 230 protocol, and a 5V DMX 232 protocol. DALI is a digital control protocol that allows individual addressable luminaires. The protocols may each include algorithms, which may be implemented in a Micro Controller Unit 2 (MCU-2) 204. According to an aspect, the MCU-2 204 is powered by an AC to DC 5V, 24V power module 220 via a power line connection 240. MCU-2 204 may also be connected to a power meter 114 via a Micro Controller Unit e.g., MCU-1 and a Universal Asynchronous Receiver/Transmitter (UART) 224. According to an aspect, MCU-2 204 is also connected to a Relay 206. MCU-2 204 may also be connected to a Wireless Interface Module (WIM) 210 via a Serial Peripheral Interface (SPI) bus 212. In an embodiment, the MCU-2 204 also controls the Relay 206, which may be designed to be able to cut off/block a current to the luminaire 112 upon a decision by the MCU-2 204. The power cutoff can be used to disconnect power from the controlled luminaire subsystem (see, for example, FIG. 1). In an embodiment, the WIM 210 is implemented as a Bluetooth Low Power (BLE) device that uses Mesh BLE protocol to connect with other devices, as well having the SPI bus 212 and an Inter-Integrated Circuit Two-Wire Serial Interface bus (TWSI) 216. The WIM 210 is connected to the Camera Interface System (CIS) module 214, which may be, for instance, an environmental sensor and a Red, Green, Blue (RGB) sensor combination device. The CIS module 214 can be extended via a second TWSI bus 226 with other sensor modules. The CIS module 214 may require a clock, which is received via an AC Frequency to a clock module interface 218. The WIM 210 may require power, which is typically received via the AC to DC 5V, 24V power module 220 via the power interface line 240. According to an aspect, an AC Power 90V-240V power module 222 is relayed to the MCU-2 204 via a Line Control (LNNL) 234, and relayed from the MCU-2 204 to the soft switch 202 for power selection for the dimming protocol interfaces. The AC Power module 222 may also be relayed to the power meter 114 via the LNNL 234, which measures all power delivered to the luminaire 112. The LNNL 234 is illustrated in FIG. 2, and according to an aspect, provides the physical electrical line connections.

Figure 3:
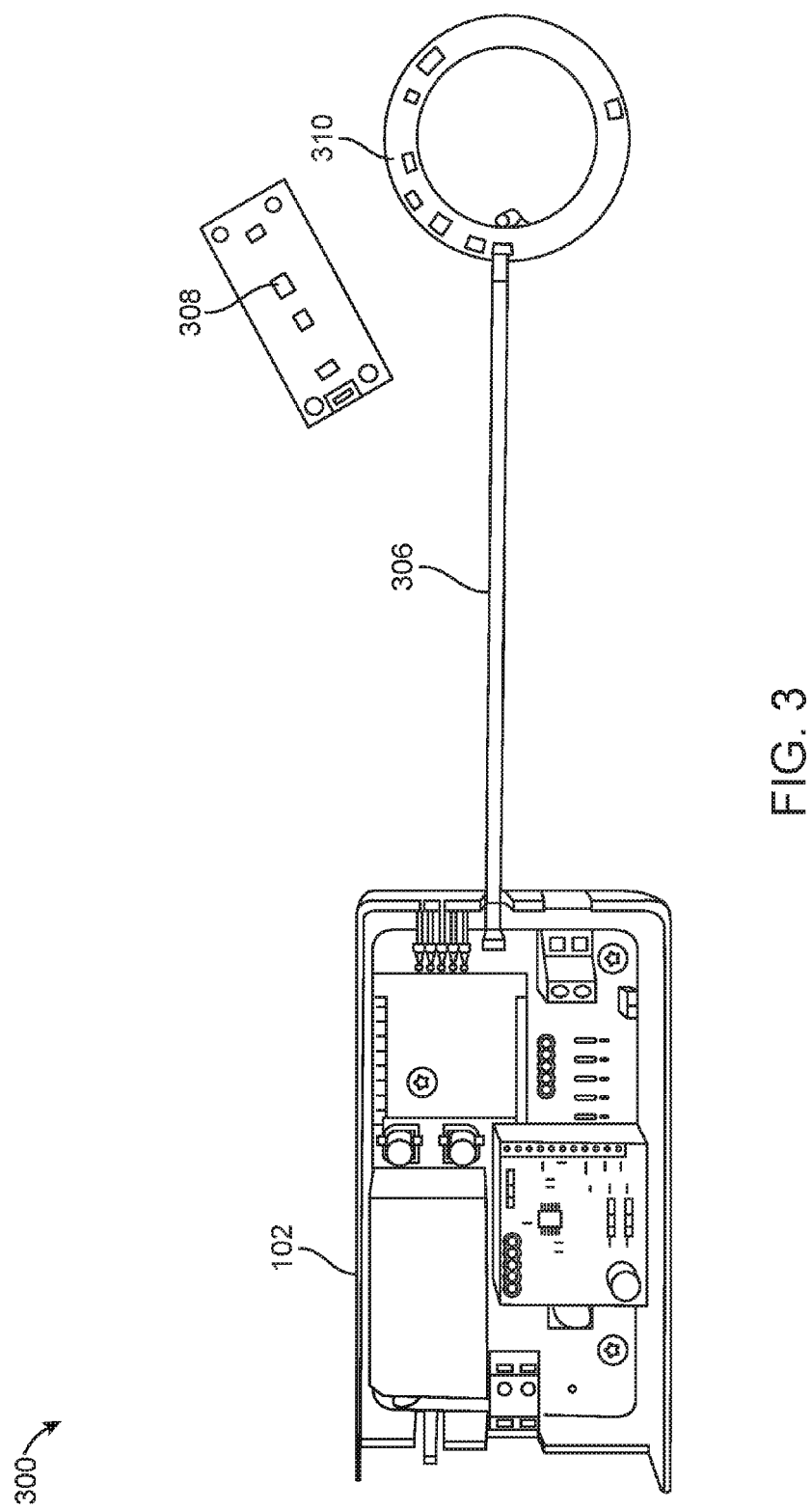
FIG. 3 illustrates a diagram of an exemplary sensor connection to a luminaire.

According to an embodiment, and as illustrated in FIG. 3, the system 300 may include one or more sensors 308, 310, typically configured as CIS modules, connected to the gateway 102 via the TWSI connection using a 6 pin or 8 pin FPC cable and a connector 306. FIG. 3 illustrates an embodiment that includes at least one of a first CIS module 308 and a second CIS module 310. (Only one connection is actually depicted, but it would be understood by one of ordinary skill in the art that one or both of the sensors 308, 310 can be connected to the gateway 102.) The CIS modules 308, 310 may be physically connected at any desired position on the luminaire 112 (not shown). According to an aspect, the CIS module 308 is a linear module that can be adopted to fit on luminaires 112/devices that require a linear fitting. In an embodiment, the CIS module 310 is circular, and may be designed to fit circular-shaped luminaires 112.

In an embodiment, each of the CIS 308 and CIS 310 sensors include at least two sets of sensors (not shown). A first set of sensors (e.g., "environment sensors"), may be dedicated to environment sensing, and may be arranged such that the sensor faces away from and/or extends in a downwardly fashion from the luminaire 112. According to an aspect, a second set of sensors or a single sensor (e.g., a "color sensor"/"RGB sensor") is arranged such that it faces the luminaire 112 directly. As described herein, the first set is named the environment sensor and the second set is named the RGB color sensor. The combination of the two sets of sensors, namely the environment sensor and the RGB color sensor, may be combined into a single ASIC or may be arranged as a set of separate devices. According to an aspect, the first and second set of sensors of the CIS 308 and CIS 310 modules may also connect with the gateway 102. Both sets of sensors may provide real time measurements and assessments to the gateway 102. In response to the measurements and assessments provided, the gateway 102 may control the dimming device and change the dimming level and a color temperature and RGB/RGBW (Red Green Blue Warm White) color, in devices that allow for color temperature and RGB/RGBW color control.

According to an aspect, the RGB color sensor may directly face the luminaires 112 (not shown). The RGB sensor may measure both the RGB content of a light source and the color/RGB intensity of the light source. According to an aspect, the RGB sensor or combination of sensors are configured to measure multiple color channels.

The environment sensor may be a low-resolution imaging sensor, such as an array of sensors combined into a low-resolution imaging device, or a single ASIC that is an imaging sensor. According to an aspect, the environment sensor measures environmental parameters and is/are facing away from the luminaires 112. The environment sensor can be arranged to monitor the environment of the light source. According to an aspect, the environment sensor includes at least three different types of sensors, such as, a low-resolution image sensor, an ambient light sensor, and a temperature sensor. Without limitation, this disclosure refers to the three sensors included in the environment sensor as "environment sensor". In an embodiment, the environment sensor includes several environmental sensors. In other words, the environment sensor may include less or more sensors than described herein. Embodiments in accordance with the present system can use other sensors and more types of sensors to sense the environment. The environment sensor can be any sensor that is capable of collecting enough information to measure the environment, including ambient light and temperature. In an embodiment, the temperature sensor measures temperatures relative to the LED temperatures. Embodiments in accordance with present system can correlate between temperature readings by the temperature sensor and the luminaire temperature. In an embodiment, the environment sensor is also an environment color sensor, which provides the color intensity of the environment ambience. The color intensity of the environment ambience may enable the system to tune up the color intensity reading coming from the color sensors facing the luminaire 112. That is, the system is capable of initializing and tuning up luminaires 112. As understood herein, "tuning up" refers to resetting of the expected measured sensor ranges in which gateway 102 controls the operation of the luminaire. According to an aspect, the cloud server 106 and/or the gateway 102 continuously monitors the information from the sensors and only triggers the initialization and/or tuning up of the luminaires 112 interface based on a change in the information, and/or a change in hardware or software of the luminaire 112, the gateway 102 and/or the sensor subsystem 108.

In general, aspects of the present disclosure describe a method of predicting the half-life of the luminaire based on color. Embodiments in accordance with the present system also provide a method for the system to identify and control dimming levels of a plurality of luminaires over time. The method may include the system receiving a plurality of sensor readings associated with the dimming levels of the luminaires over time wherein the plurality of luminaires are connected to a plurality of sensors.

The method includes interfacing by gateway 102 with a plurality of other control systems and/or devices via at least a wired connection, an Ethernet connection, a wireless connection or a combination thereof. According to an aspect, gateway 102 receives instructions to control the dimming level of the plurality of luminaires via its dimming interface. The interface present in the gateway may be a backhaul interface running a backhaul protocol. In an embodiment, the backhaul protocol is responsible for delivering instructions to the gateway to control the dimming level of the plurality of luminaires. The method may further include receiving by the gateway, from a plurality of sensors, information regarding color contents, color intensities and the light sources' environments, which is directly associated with the dimming level instructions. The gateway may further include various methods and/or tools to record received instructions.

The method includes communicating and handling a plurality of dimming protocols by gateway 102 via its dimming device 100 interface. In an embodiment, the plurality of dimming protocols may be at least a 0V-10V, 1V-10V, DALI, DMX, digital protocols and analog protocols, and so on.

The method may include controlling a dimming device located inside the plurality of luminaires by the gateway. According to an aspect, controlling the dimming device by the gateway is utilized by the system to change the dimming level and/or the color temperature and/or the RGB/RGBW colors of the plurality of luminaires based on the database of instructions associated with a time schedule. In an embodiment, the gateway receives a set of instructions associated with dimming setups and a plurality of sensor measurements from a plurality of sensors according to a specific moment of any day. The receiving method may record these instructions and a scheduler checks the information on a timely basis and acts on these instructions.

According to an aspect, a method to program the plurality of sensors controlled by gateway 102 in such a way that the plurality of sensors will provide data to gateway 102 only when the color intensities are outside of a predetermined range is provided. In an embodiment, a method to enable scheduling control in ways/manners that allow measurements to be taken only when environment measurements, as well as the dimming levels, reach certain ranges and within time schedule limitations of the gateway is provided. In an embodiment, the dimming parameters, the sensor parameters, and the reading setups are delivered all or in parts from outside of gateway 102 via at least a cloud server 106. The gateway 102 may be configured to communicate these parameters, store them on the device in a database and manage their life cycle.

The method may include measuring real time power by at least one power meter 114 connected to at least one luminaire 112, wherein the real-time power measurements correlate 1-1 to the power drawn by the plurality of luminaires at any given moment. The interface between the gateway and the power meter may be a Universal Asynchronous Receiver/Transmitter (UART) or other communication interfaces ("power meter interface").

The method includes receiving continuously by the gateway real-time performance measurements from a plurality of sensors connected with the gateway via the sensor interface and power measurements from a power meter via a power meter interface. According to an aspect, gateway 102 compresses and sends these said measurements to at least one cloud server 106. The compressed format may include a baseline message set and an update message set. In an embodiment, the two sets of messages are unique and separate. The baseline message set may include the full sensor readings, power level readings and current dimming state. The update message set may include changes or differentiations from the previous message set. The gateway 102 may identify major changes that require a new baseline message set to be sent. Such major changes may include a change in scheduled dimming level and/or a change in the environment reading that requires a new baseline set. According to an aspect, the gateway includes a system that sends the updates message set at regular intervals. The updates message set may include readings that are significantly different from the previous set. In one embodiment, the updates message set recognizes significance in reading changes based on a table of sensor ranges appropriate to the specific luminaire that is set by the cloud servers. In an embodiment, sensor readings from the plurality of sensors can be averaged over the time interval between two consequent updates.

According to an aspect, the cloud servers 106 use a method for continuously receiving a plurality of performance measurement information arriving from the gateways. The pluralities of cloud servers may use methods to perform correlation between the received plurality of performance measurements and the specific luminaire characteristics controlled by the gateways. In an embodiment, the present system provides derivations of at least one lumen prediction graph by the plurality of cloud servers. The prediction may be based on the lumen prediction graph, that is, the theoretical lumen degradation prediction graph in ideal known conditions estimated by the luminaire manufacturer and the gateway measurements. In a separate embodiment in accordance with the present disclosure this correlation information can accurately predict $L_{70}$ and $L_{50}$ for the specific luminaire in its current environment.

The method may include predicting an accurate lumen degradation graph by the cloud server's system. The predictions of the lumen degradation graphs may be based on timely correlations between the dimming state changes and the real-time sensor readings of the environment and color sensors, as well as AMP levels used by the luminaires. In an embodiment, cloud server 106 uses the correlated information and predictions to recommends alternative dimming schedules that will extend the half-life ($L_{50}$) of the luminaires in the system, while maintaining expected luminosity at the appropriate levels.

Embodiments in accordance with the present system predict accurate lumen degradation or depreciation graph for the specific luminaires 112 attached to the system 100. The prediction of the lumen depreciation graph may be based on correlation between dimming state changes and real time sensor readings of the environment and color sensors, as well as the AMP level used by the luminaire 112. System 100 is capable of using these predictions to recommend alternative schedules to extend the half-life ($L_{50}$) of the luminaires 112 in the system 100 while maintaining expected luminosity at the appropriate level.

System 100 is optionally capable of providing reverse predictions in which based on a given luminosity dimming schedule for the specific luminaires 112, and based on real time sensor readings, system 100 can accurately predict the half-life of the luminaire 112.

Figure 4:
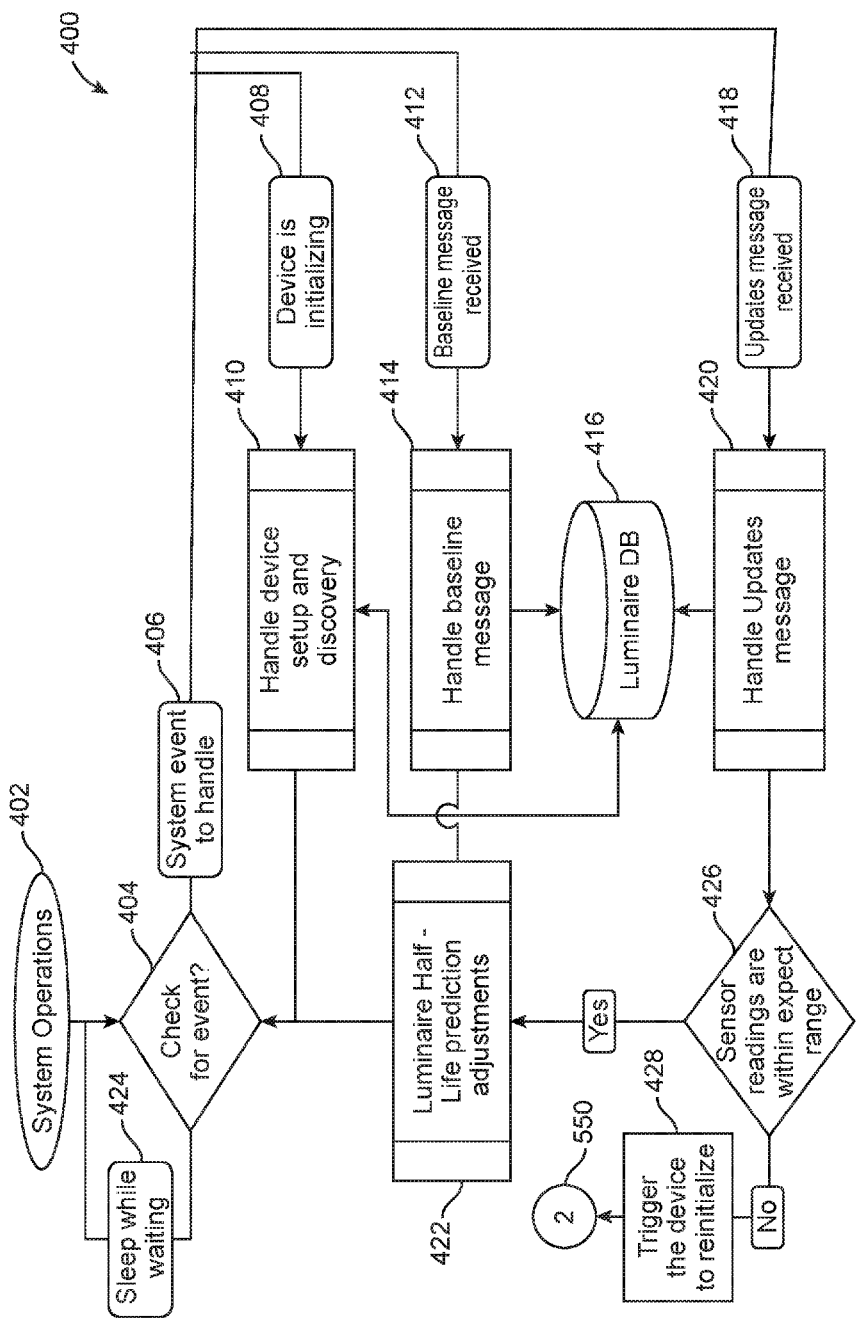
FIG. 4 illustrates a flow chart of an exemplary system handling a procedural global event such as system initialization or baseline or updates messages received.

FIG. 4 illustrates a flow chart of a method 400 for system 100 in which system 100 is configured to perform various high-level system operations 402 via the server 106 (see FIG. 1), and in particular is configured to predict lumen depreciation and/or life expectancy, and to make correlations between the two. According to this method, gateway 102 may initialize operation of system 100 based on at least one communication message exchanged with the server 106. At step 404, the system checks whether there are events (explained below) that need to be handled. If the result of step 404 is that there are no events that need to be handled by the system, the operation goes to step 424, during which the system may go back to sleep. If the result of step 404 is that there are events that need to be handled by the system, the operation goes to step 406. At step 406, the system checks different events that need to be handled. Exemplary events 408, 412, and 418 may be present, as follows. These events may include a first event at step 408 ("Device is initializing"), a second event at step 412 ("Baseline message received"), and a third event at step 418 ("Updates message received").

At step 408, the system may identify the first event, which may be to initialize and/or handle a current device/luminaire, then move to step 410. At step 410, a new/modified device/a new/modified luminaire may be discovered and properly set-up. If the device is already initialized, the system may look for a baseline message at step 412 and/or an update message at step 418.

Thus, at step 412, the system recognizes the second event, which may include receiving baseline messages. The baseline messages include but are not limited to initial settings and/or readings from the dimming control device, sensor subsystem and/or power meter related to the specific luminaire(s). At step 414, the system may handle the baseline message(s) and simultaneously forward the baseline message(s) to a luminaire and/or driver database (DB) 416 and/or step 422. According to an aspect, the baseline message(s) are collected/recorded in the luminaire and/or driver DB 416, which is a repository to receive and store information from the sensor subsystem and/or power meter and/or aspects of the individual luminaire/LED. At step 422, the baseline message(s) may be used, in conjunction with all other data collected in other steps, to establish and/or update/adjust the half-life and/or end-of-life prediction and requirements for the specific luminaires. The luminaire database 416 is configured to receive and store the information collected from the system and/or luminaires.

Alternatively, and/or simultaneously, at step 418, the system recognizes the third event, which may include receiving the updates message(s). The updates message(s) include but are not limited to settings and/or readings from the dimming control device 110, sensor subsystem 108 and/or power meter 114 related to the specific luminaire(s) 112 that are received at a point in time (other than the initial settings and/or readings received with the baseline messages and are essentially updates to previously recorded settings and/or readings). At step 420, the system may handle/process the updates message 418 and then forward the updates message simultaneously towards the luminaire 112 and/or driver DB 416 and step 426. Step 420 is described in detail in FIG. 15. The updates message may be received and recorded in the luminaire and/or driver DB 416. At step 426 the system decides whether to continue with updating the luminaire half-life prediction at step 422 or to skip step 422 since the updates message 418 is conveying a reading that is outside the expectation. If sensor readings are not within expected range, the system will move to step 428 which will trigger a message to the device to start an initialization process at step 550 thereby recalibrating the sensors (as explained further in FIG. 5). At step 422, the updates message(s) may be used, in conjunction with all other data collected in other steps, to establish and/or update/adjust the half-life and/or end of life prediction and requirements for the specific luminaires.

After handling incoming messages of any type, such as, for example, the baseline messages or the updates messages (see, for instance, FIG. 7), the measurement updates or changes may be transferred to and recorded in the luminaire and/or driver DB 416. According to an aspect, the luminaire and/or driver DB 416 also records the handling of the device setup and/or the device discovery. At step 422 (after the handling of the baseline message and the updates message at steps 412 and 418), the system may predict the luminaire half-life or adjust its predictions of the luminaire half-life based on the updates, and as will be discussed in greater detail hereinbelow with reference to FIG. 8. A person of ordinary skill in the art would appreciate that changes in the dimming schedule of any luminaire will impact the luminaire's half-life expectancy, therefore, over time and based on usage, the predictions will change and become more accurate to the specific point-in-time of the measurements.

According to one aspect, the server utilized in the system operations 402 is at least one of a cloud server 106 and a local server. In an embodiment, the system performs the system operations 402 via only the cloud server (see, for instance, FIG. 5.) The cloud server 106 may primarily be in a sleep mode while waiting to check for the presence and/or status of events. As such, cloud server 106 may be in a reactive mode, during which it waits for the occurrence of events. Alternatively, cloud server 106 may actively/regularly wake up from its sleep mode, to check/assess whether any of the events exist 404. According to various aspects, the server manages each of the first, second and third events 408, 412 and 418 at different stages/through different processes. According to an aspect, the first event 408 is managed/handled during a set up and discovery process, illustrated in FIG. 4 as 'Handle device setup and discovery' 410. (See, for example, FIG. 5.) The second event 412 may occur when a baseline message has been received, and is illustrated in FIG. 4 as 'Baseline message received'. The handling of baseline messages/'Baseline Message' types of messages is described in further detail hereinbelow, with particular reference to, for example, FIG. 6. The third event 418 may be associated with the receipt of message updates, and is illustrated in FIG. 4 as 'Updates message received' 418. Creation of updates messages/'Updates Message' types of messages is described in further detail hereinbelow, with particular reference to, for example, FIG. 7.

Figure 5:
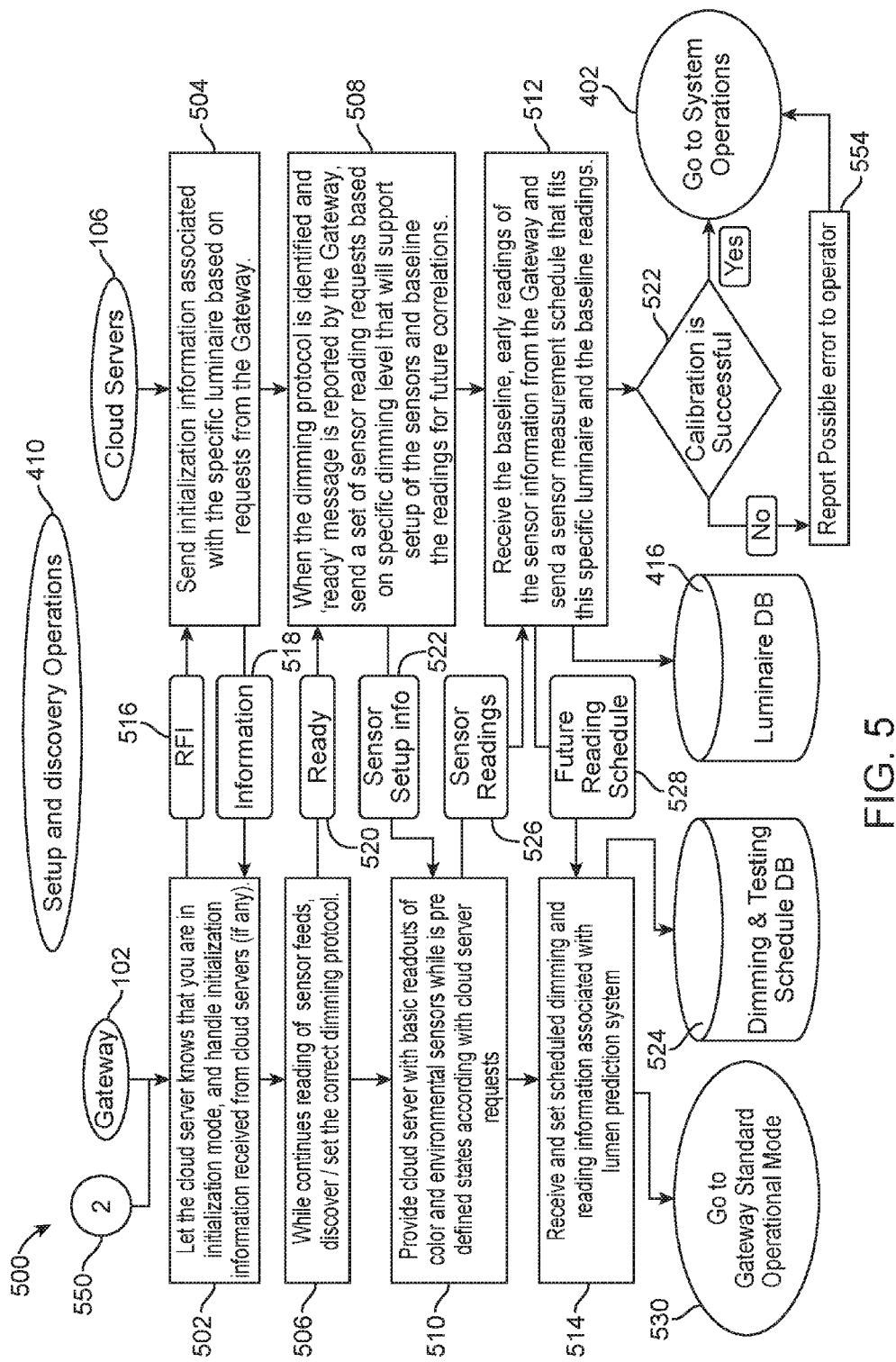
FIG. 5 illustrates a flow chart of a device setup and discovery stage of the present system.

FIG. 5 depicts an embodiment 500 of the system 100 handling of device setup and discovery operations starting at step 410. Step 410 includes the discovery and proper set-up of the device/the luminaire. The setup and discovery operations may include a flow of information that occurs as two separate parts of the system 500, each including a request for information (RFI) 516 flow to server 106 and a flow from the server 106 of Information 518, which may include minimal initialization information from a particular controlled luminaire (as described above with reference to, for example, FIG. 1).

According to an aspect, the first event after turning on a gateway 102 may include the RFI 516 being sent/transmitted from the gateway 102 to the server 106. As illustrated in FIG. 5, at step 502, the gateway 102 may send the RFI 516 towards the server 106. It is also possible to get to step 501 via step 550 which is a re calibration trigger by the server 106. The gateway 102 may ask the server 106 to provide the minimal initialization information 518. If server 106 is already familiar with the particular luminaire, the first event 408 may include providing more information 518 based on this knowledge/familiarity/association with the particular luminaire. At step 504, the cloud server 106 may return the initialization information 518 to the gateway 102, then proceed to step 506. At step 506, the gateway 102 may continue to read sensor feeds, and identify/discover/set the correct dimming protocol/level. According to an aspect, once the gateway 102 has set the appropriate dimming protocol for the luminaire, a "ready" message 520 is sent to the server 106. The ready message 520 may include identifying the luminaire, the luminaire's dimming protocol and sensor information, as collected during the dimming protocol test/discovery 506 by the gateway 102, as described in greater detail in the '263 application. In an embodiment, the server 106 responds with dimming and sensor information 522 associated with the setup of the sensors for baseline and for tune-up. At step 510, the gateway 102 may set the luminaire to a pre-defined state and collect the reading of the sensors, such as, for example, the color sensors and the environmental sensors. According to an aspect, the information collected is sent to the server 106 as part of a 'Sensor Readings' message 526. The information collected may include the baseline or early readings of the sensor information. In step 512 the cloud servers 106 may then send back a future reading schedule 528 that includes final tune-up information, a schedule for dimming, and/or a sensor measurement schedule for measurements that need to be done on a regular basis. While sensor measurements may begin upon installation of the luminaire, sensor measurements would not typically impact the predictions of life expectancy until the device had achieved about 1000 hours of service or operation. In other words, the calibration or calculation of the real-world life expectancy of the particular luminaire 112 would not be impacted until after the luminaire had been working for 1000 hours. The cloud server 106 may also look at the calibration values and decide one of the following outcomes: (1) the calibration is successful, in this case in step 552 it will continue with system operations 402; or (2) calibration indicated that the sensor was moved or the luminaire was replaced (in this case continues monitoring may indicate a need to send a possible error report to the operator in step 554 while continuing with monitoring and trying to calibrate the system).

According to an aspect, at step 514, gateway 102 receives and sets scheduled reading and dimming information associated with the half-life prediction system/lumen prediction system. The server 106 may update the luminaire DB 416 and continue to system operations 402 (see FIG. 4). In an embodiment, the gateway 102 records the scheduling information in a dimming and testing schedule DB 524. The operation of gateway 102 may continue to the gateway standard operational mode 530 (see FIG. 6).

Figure 6:
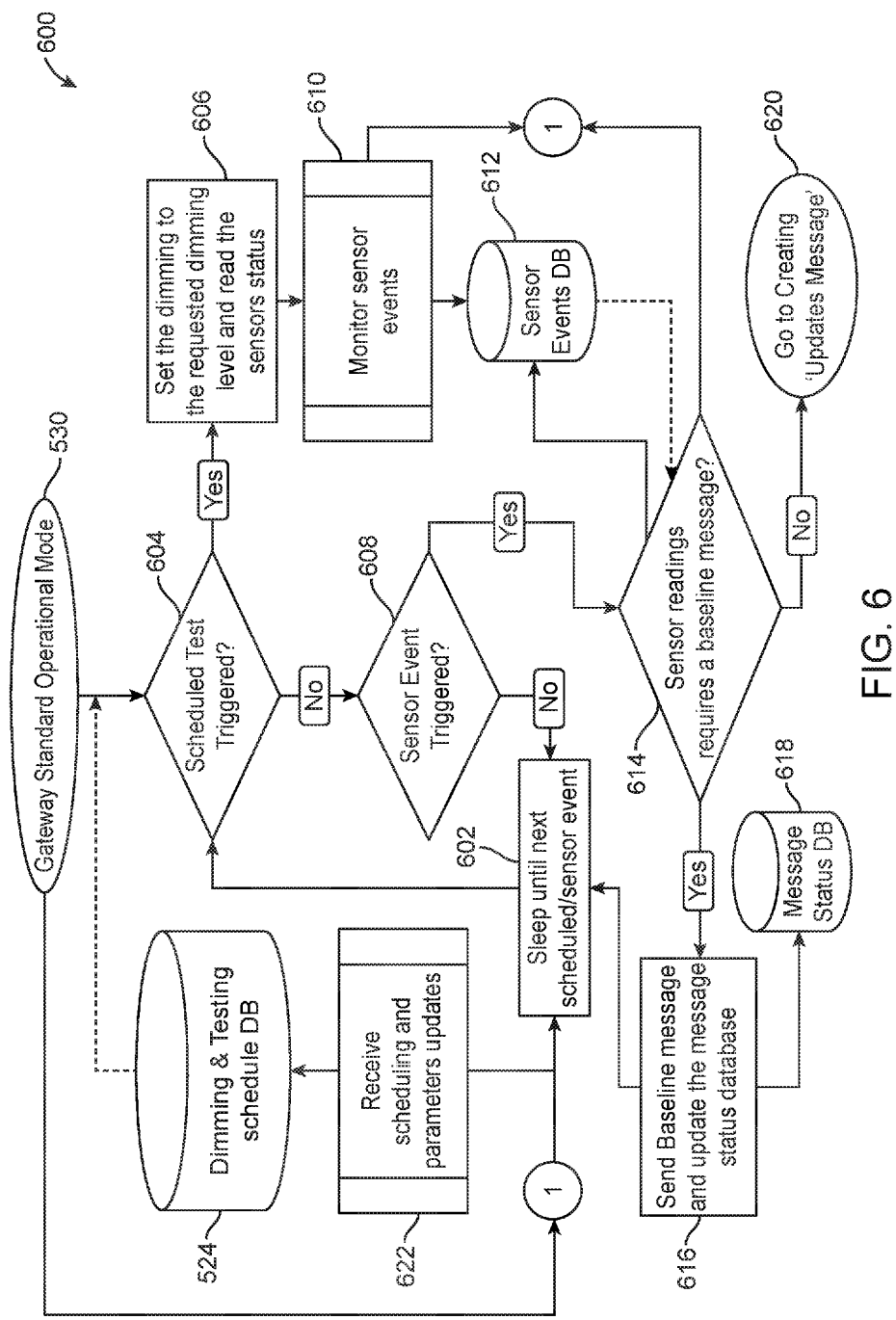
FIG. 6 illustrates a flow chart of a system handling a gateway Standard Operational Mode.

FIG. 6 illustrates an embodiment 600 of the gateway standard operation mode 530. At step 602 gateway 102 is primarily in a sleep mode during which it waits for one or more events to occur. In an embodiment, each event may include setting a new dimming level and waiting for a single sensor event or multiple sensor events. According to an aspect, the types of the events the gateway may wait to occur include two types. The first type of event may be associated with existing dimming and testing, including, for example, at a specific/designated time, setting a specific dimming level, and waiting for a set of sensor readings. For instance, at step 622, a "receive scheduling and parameters updates" process 622 may update the dimming and test schedule DB 524 and may also refresh a sleeping timer (not shown) for the gateway to wake at the next appropriate test schedule. According to an aspect, the second type of event includes current/present sensor readings that need to be read and processed.

When gateway 102 is out of sleep mode/initialized, the gateway may receive a scheduling message from cloud servers 106 as seen at step 622. The scheduling message may include parameters to populate the dimming and test schedule DB 524. At step 604, the gateway may check for any scheduled tests, which may be waiting in the dimming & testing schedule DB 524. For instance, when the scheduled test is triggered at step 604, gateway 102 may set the dimming level to a requested lumen/light percentage. According to an aspect, the gateway does not process or handle events that are not planned for and/or scheduled by the dimming & testing schedule DB 524. If at step 604 there is no scheduled testing event waiting, e.g., 'No', then the operation moves to step 608, where the gateway checks for any triggered sensor events as described in greater detail below. If at step 604, the scheduled test is triggered, e.g., 'Yes', the operation proceeds/moves to step 606 where gateway 102 sets the dimming protocol to a requested dimming level and reads the sensor status. In an embodiment, after step 606, the gateway performs step 610 where the gateway starts to monitor sensor and/or driver events—e.g., has the sensor(s) or driver/dimming control device changed?

Scheduled dimming level and sensor measurements are conducted at step 606, and include a plurality of sensor readings that are completed at step 610. The sensor measurement event requests can be, for example, waiting for the temperature readings to reach a specific level/range, waiting for the AMP reading to reach a specific range, reading color intensity for a plurality of colors multiple times, and the like. Such event data is recorded in the sensor and driver events DB at 612. In an embodiment, when a sensor event occurs, there can be multiple outcomes. For instance, if the sensor reading is the last sensor reading required for this specific scheduled dimming measurement, the gateway may make a decision if the set of measurements requires a new Baseline message at step 614, and if "No", moves to create an Updates message at step 620. In the case of a baseline message, the gateway may format a new baseline message at step 616 and send it to the server, (not shown), update the schedule to wait for the next dimming schedule and go to sleep at step 602.

Figure 7:
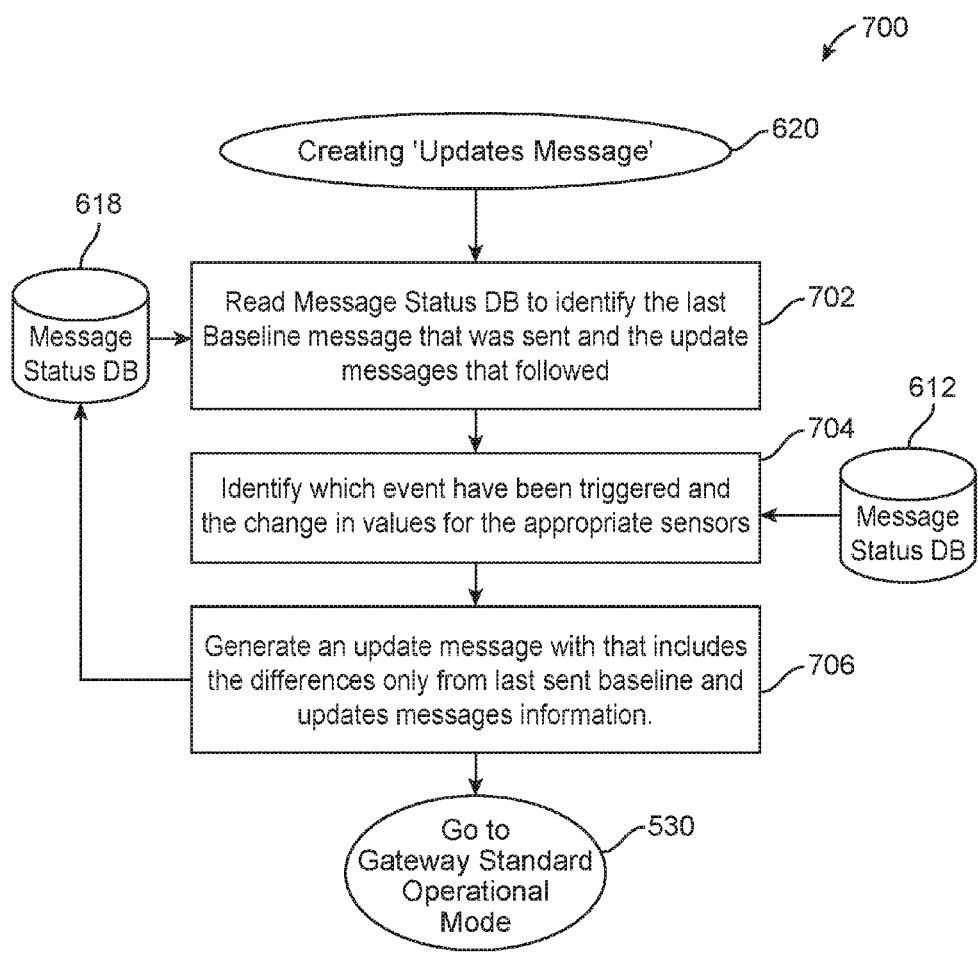
FIG. 7 illustrates a flow chart of a system creating an "Updates Message"

The updates message is described in further detail hereinbelow, and is shown in FIG. 7. In one embodiment, after the updates message is handled, the gateway goes back to sleep (see, for instance, FIG. 4). The case may occur when there are more events associated with/chained to the current scheduled dimming that the gateway must wait for. In this case, the gateway may go to sleep/enter a sleep mode while waiting for those events. According to one aspect, before the gateway goes to sleep to wait for the other events, the current event is recorded in the Sensor Events DB 612, where all accumulated and scheduled events are recorded for future processing.

At step 608, gateway 102 may check for any triggered sensor events. If the response is 'Yes', than the operation moves to step 614. If the response is 'No', then the operation may go back to the step 602 and wait for an event to occur. According to an aspect, at step 614, the gateway may decide if the sensor reading requires baseline messages. If the response is 'Yes,' then the operation moves to step 616. If the response is 'No', then the operation moves to step 620.

In an embodiment, the decision to move to one of the step 616 and the step 620 is based on multiple factors, which may primarily include differences between the previous baseline message and the current changes in the baseline messages. According to an aspect, the operation may also move to one of step 616 or step 620 if there is no prior baseline message. In an embodiment, at step 616, the gateway sends baseline messages and then moves to step 618, where the message status database is updated. When there is a need for an updates message, the operation of gateway 102 may go to step 620. When message generation/creation of updates message is complete/done, the operation of gateway 102 may move to the step 602 and wait for the next event to occur.

In an embodiment, each event may include setting a new dimming level and waiting for a single sensor event or multiple sensor events. For every event that occurs, the operation may move to step 612 where the gateway updates the sensor events DB. According to an aspect, monitoring sensor events occurs in parallel/in the background by step 610, while the gateway proceeds to step 602 where the gateway waits for an event to occur.

FIG. 7 illustrates an embodiment 700 of the creating 'Updates Message' 620 described hereinabove and illustrated in FIG. 6. According to one aspect, the creating of the Updates Message may depend on the accumulation of all prior messages sent and recorded in the Message Status DB 618. Based on past/previous messages and current event information stored in the events DB 612, the gateway may identify sensor readings that have changed and may format a message to include those readings only, and send this message to cloud server 106. According to an aspect shown in FIG. 6, once this message is sent, the message status DB 618 may be updated for future analysis, and the gateway may go back to sleep and wait for the occurrence of any next events as part of the standard operational mode 530.

As illustrated in FIG. 7, step 702 receives messages from the message status DB 618, and gateway 102 may identify the last baseline message sent and the updates message that followed. At step 704, gateway 102 may identify which of the events has been triggered and what changes have taken place in the values for the appropriate sensors, after receiving information from the sensor events DB 612. According to one aspect, gateway 102 generates an updates message at step 706 (which may include only the differences between the previously sent/last sent baseline message and the accumulated updates message information, and the current sensor readings 612). The process of creating updates message 620 (see FIG. 6) may proceed to step 530 in which the gateway moves into the standard operational mode 530. According to one aspect, at step 706, the gateway may simultaneously update the message status DB 618.

Figure 8:
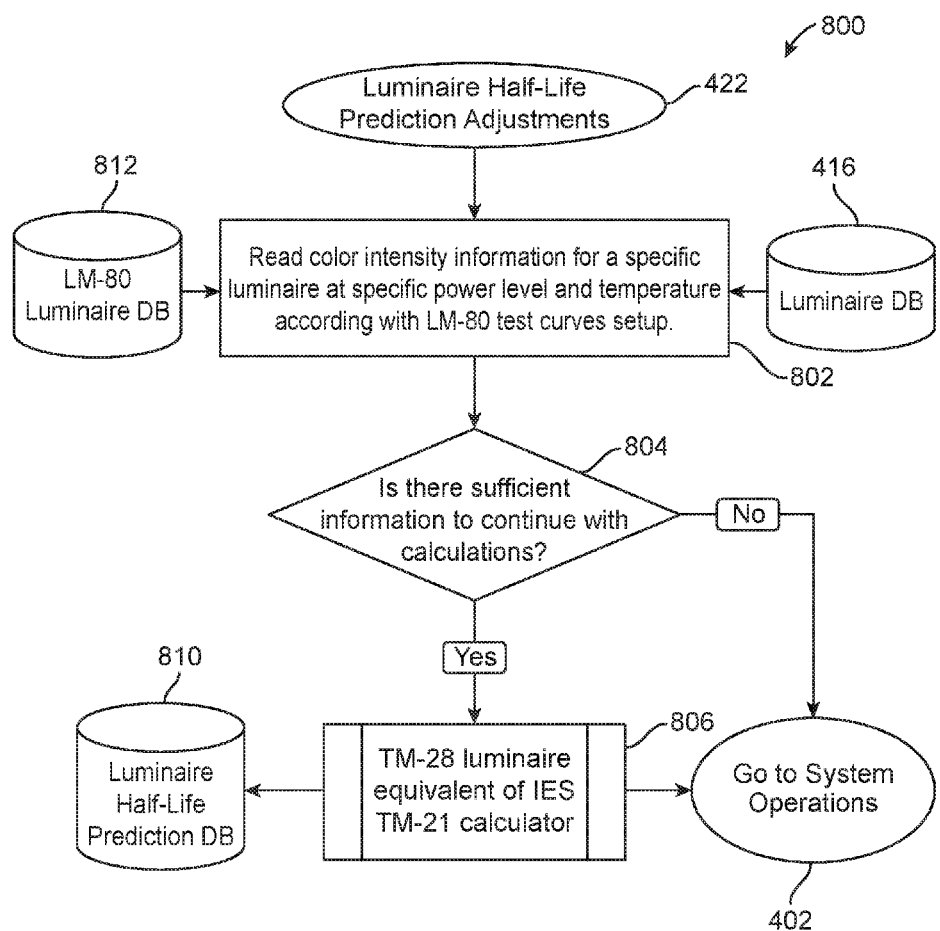
FIG. 8 illustrates a flow chart of an exemplary system including cloud servers for calculating specific luminaire half-life prediction information.

FIG. 8 illustrates an embodiment 800 of the system 100 including cloud servers (not shown) that are configured to calculate specific luminaire half-life prediction information. According to an aspect, in order to calculate intensity depreciation, color sensors are utilized to demonstrate readings and/or measurements that are linearly correlated to a luminaire light intensity depreciation graph. The color sensors may be consistent in their readings across a plurality of sensors, such that when, for example, a LED light intensity reading is changing by X %, the sensor color intensity reading changes in the same X %. In an embodiment, the sensor readings 'total intensity readings' are not equivalent to the actual lumen emission by the luminaire device that the sensors are attached to, which is usually the case. A person of ordinary skill in the art would understand that when this relationship is presented in a graphical format, and exponential graphs are linearly correlated, a change in one (the curve) can fit the curve (change) in the other directly.

According to an aspect, the system 800 includes an LM-80 luminaire DB database 812. The LM-80 luminaire DB database 812 may include the manufacture's specification information as described in detail hereinabove, and the manufacturing data for a plurality of LED light sources, which when paired with a luminaire's chip running temperature, may provide a theoretical predictive life calculation. According to an aspect, testing the luminaire to LM-80 standards and utilizing any LM-82 data may help to create the luminaire DB database 416. The luminaire database 416 may include information specific to the fitting and dimming, as well as to the sensor reading ranges, etc., associated with the specific luminaire. According to an aspect, the luminaire database 416 includes all past sensor readings, with associated times of reading, dimming level, temperatures and current readings. The sensor, temperature, and current readings may be normalized based on the original readings received upon installation of the luminaire.

According to an aspect, the luminaire half-life prediction adjustment 422 begins at step 802 wherein the cloud servers 106 may read the color intensity information for a specific luminaire 112 at a specific power level and temperature after receiving information from the LM-80 luminaire DB 812 and the luminaire DB 416. The luminaire DB 416 may include information that is specific to the fitting and the dimming, as well as to the sensor reading expected ranges, etc., associated with the specific luminaire. According to an aspect, the luminaire DB 416 includes all past sensor readings, with associated times of reading, dimming levels, temperatures and current readings—each of which may be accumulated, as depicted in FIGS. 4-7. The sensor, temperature, and current readings can be normalized based on the original readings received upon installation of the luminaire, as described hereinabove, with reference to FIG. 5. According to an aspect, the multiple sensor readings associated with color intensity can first be normalized using an equation, where the present reading is divided by the initial reading taken when the luminaire was first initialized.

At step 804, the cloud servers 106 may decide if the collected accumulated information is sufficient to continue with calculations. If the response is 'Yes', then the operation moves to step 806. If the response is 'No', then the operation instead moves to step 402, which is the system operation's main loop and as shown in FIG. 4. According to an embodiment, the system 800 includes a TM-28 luminaire. According to an aspect, the TM-28 luminaire is the luminaire equivalent of an (Illuminating Engineering Society) IES TM-21 calculator, and the TM-28 takes data collected over time in the luminaire DB 416 for use as test samples. This information may be plotted after normalization of the information/data of the TM-28 luminaire, which may facilitate accurate prediction of lumen maintenance over time. The standard information within LM-80 DB 812, provided by the LM-80 manufacturer, is typically insufficient to make such predictions as it may be dependent on a fixed temperature and the current state of the luminaire for the readings. In an embodiment, the system 800 may use the sensor readings at specific temperatures and dimming levels to extrapolate the place of the luminaire color intensity readings on the LM-80, given curves of this specific luminaire. Using this information, and knowing the time period elapsed between readings, and after correlating this information with previous readings, the system 800 can extrapolate a new curve that more accurately represents the current luminaire's behavior and report this new curve and/or new/updated half-life prediction to a user. This new curve may be based on information collected from the system and sensor subsystem of the luminaire's true environment and usage over time, such as, for example, dimming schedule, power and temperature levels, degradation of the lens, and degradation of the luminaire's physical fittings. According to an aspect, this information is stored in the luminaire half-life prediction database 810 for future use (e.g., to be provided to the user to modify, for instance, a replacement schedule), and the next step may include waiting for the next event as part of the system operations 402. According to an aspect, at step 806, the TM-28 luminaire equivalent of IES TM-21 calculator takes data that was collected over time in the luminaire DB for a test sample and plots this information after normalization into TM-28. This step may allow for prediction of lumen maintenance over time. The information generated in step 806 may be stored in the Luminaire Half-life Prediction DB 810 for future use. According to an aspect, it is possible for the server to store and access information collected from large numbers of luminaires that are not limited in geographical location. In other words, it is possible for the system contemplated herein to collect information/data from installations around the globe, and to thus compare data received from luminaire systems installed and operating in China, the United States, Japan, and the like. Providing new curves and/or new/updated half-life predictions to the user (e.g. the manufacturer of the specific luminaire and/or other luminaire manufacturers) allows compilation and comparative analysis of data collected across diverse regions at various environments, barometric pressures, humidity, electrical grid conditions, locations and the like, all of which impacts actual performance of the luminaire.

Figure 9:
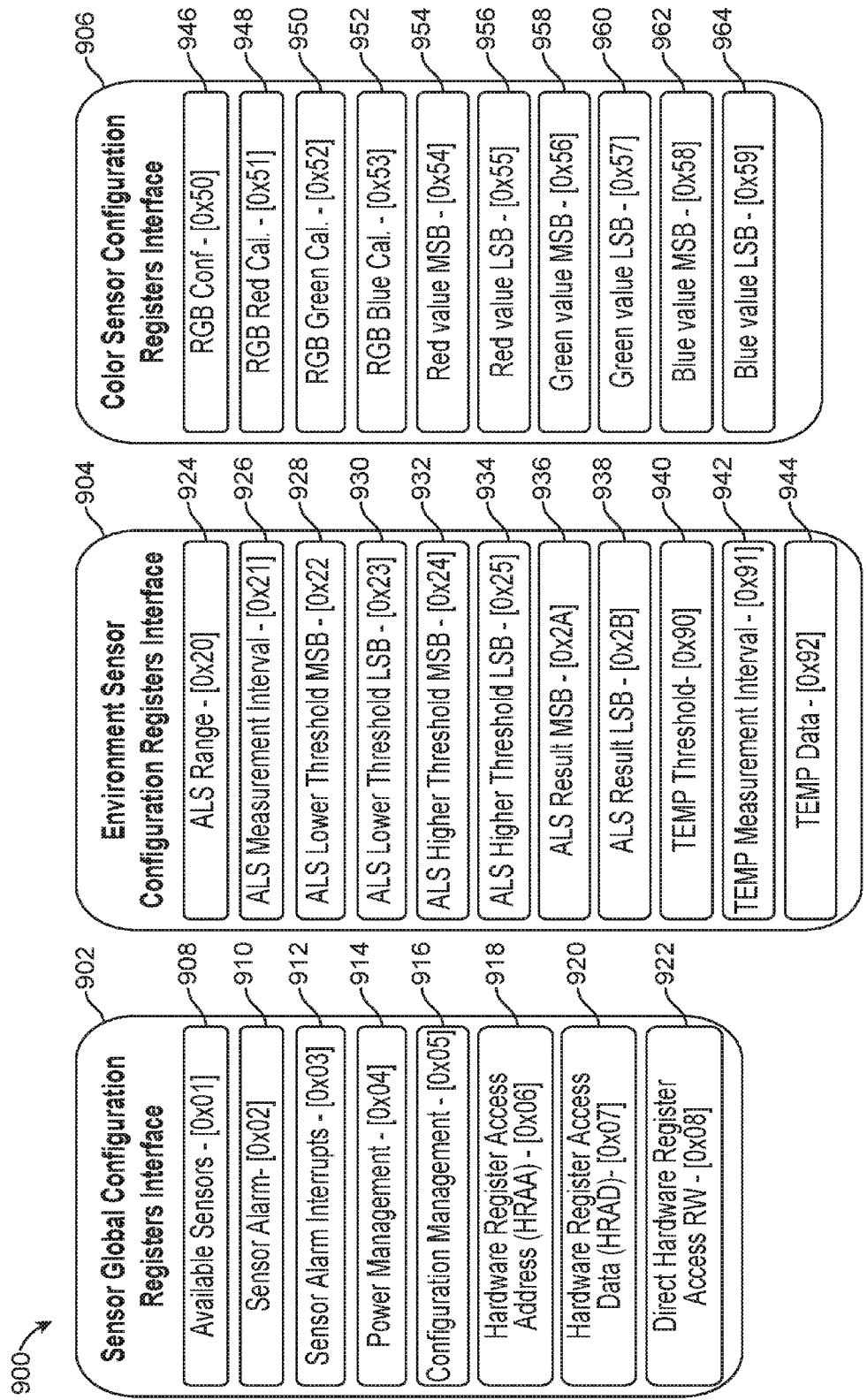
FIG. 9 illustrates a diagram of a sensor interface data structures of a system.

FIG. 9 illustrates an embodiment 900 of the sensor interface data structures. According to an aspect, the sensor interface data structure includes the Sensor Global Configuration Registers Interface 902, the Environment Sensor Configuration Registers Interface 904, and the Color Sensor Configuration Registers Interface 906. Each of the data structure interfaces 902, 904, 906 may be memory mapped registers that include an application. In order to send information via a memory mapped register, the applications of each of the registers' interfaces 902, 904, 906 may write to a memory address allocated for the respective register. To receive information, the application may read the memory address allocated for the specific register. In FIG. 9, the relative address of each register is identified/labeled/marked in boxed brackets '[ ]'. In an embodiment, the size of each address is one byte (8-bit).

According to an aspect, the Sensor Global Configuration Registers Interface 902 may include a plurality of global configuration registers configured to perform a plurality of activities. According to an aspect, available Sensors [0x01] 908 identify which sensors are available for the particular device. The Available Sensors [0x01] 908 may show a Temperature Sensor (TEMP), an Ambient Light Sensor (ALS), a color sensor (RGB), a Motion detector sensor based on PIR, a Motion detector and direction sensor based on frame capture, and the like. Sensor Alarm [0x02] 910 may show which sensors have generated an interrupt. In an embodiment, Sensor Alarm Interrupts [0x03] 912 enables and/or disables interrupt from each available sensor whenever an alarm is generated. Power Management [0x04] 914 controls power up and/or power down functions for the different sensors. Configure Management [0x05] 916 may store register values in a non-volatile memory. Hardware Register Access Address (HRAA) [0x06] 918 may hold the address for accessing the internal hardware registers of sensors, and Hardware Register Access Data (HRAD) [0x07] 920 may hold the data to load and/or store in the address given in the register HRAA [0x06] 918. The Sensor Global Configuration Registers Interface 902 may include Direct Hardware Register Access RW [0x08] 922, and if it holds a value "1", then the data in the register HRAD [0x07] 920 may be written to the address in register HRAA [0x06] 918. If Direct Hardware Register Access RW [0x08] 922 holds a value "0", then the data pointed to by register HRAA [0x06] 918 may be read in register HRAD [0x07] 920.

As also illustrated in FIG. 9, the Environment Sensor Configuration Registers Interface 904 may include a plurality of environment specific sensor registers. According to an aspect, the Environment Sensor Configuration Registers Interface 904 may include ALS Range [0x20] 924, and if it holds a value "1", the ALS Range [0x20] 924 may enable a high measurement range of 1000-10000 Lux for the ALS. If ALS Range [0x20] 924 holds a value "0", then a low measurement range of 1-1.500 Lux may be enabled. ALS Measurement Interval—[0x21] 926 may record the elapsed time between subsequent ALS measurements. ALS Lower Threshold MSB [0x22] 928 may display Most Significant Byte (MSB) for ALS lower threshold for triggering an alarm. In an embodiment, ALS Lower Threshold LSB [0x23] 930 displays List Significant Byte (LSB) for ALS lower threshold for triggering an alarm, and ALS Higher Threshold MSB [0x24] 932 displays MSB for ALS higher threshold for triggering an alarm. According to an aspect, ALS Higher Threshold LSB [0x25] 934 displays LSB for ALS higher threshold to trigger an alarm. ALS Result MSB [0x2A] 936 may display MSB for ALS measurement results. According to an aspect, ALS Result LSB [0x2B] 938 may display LSB for ALS measurement results. TEMP Threshold [0x90] 940 may display upper threshold value for when an interrupt is triggered. According to an aspect, TEMP Measurement Interval [0x91] 942 displays a temperature measurement interval in seconds, and TEMP Data [0x92] 944 displays temperature values in degrees Celsius.

As also illustrated in FIG. 9, the Color Sensor Configuration Registers Interface 906 may include a plurality of color specific sensors. In an embodiment, the colors are Red, Green and Blue (RGB). According to an aspect, RGB Conf. [0x50] 946 controls both calibration configuration and report when a sensor reading is available. RGB Red Cal. [0x51] 948 may display a calibration constant for red value from RGB sensor, RGB Green Cal. [0x52] 950 may display a calibration constant for green value from RGB sensor, and RGB Blue Cal. [0x53] 952 may display a calibration constant for blue value from RGB sensor. According to an aspect, Red Value MSB [0x54] 954 displays MSB result of Red value from RGB sensor. Red Value LSB [0x55] 956 may display LSB result of Red value from RGB sensor. Green Value MSB [0x56] 958 may display MSB result of Green value from RGB sensor. According to an aspect, Green Value LSB [0x57] 960 displays LSB result of Green value from RGB sensor. Blue Value MSB [0x58] 962 may display MSB result of Blue value from RGB sensor. Blue Value LSB [0x59] 964 may display LSB result of Blue value from RGB sensor. To be sure, a person of ordinary skill in the art can appreciate that any of a plurality of colors can be used for color intensity measurements. The sensor chosen may depend on the LED/luminaire color utilization. According to an aspect, luminaire devices may include designs that are based on preferences to emit specific colors, and the color sensor used in each case may be based on those colors. The RGB provided herein is illustrative, and other arrangements and colors are contemplated by the disclosure.

Figure 10:
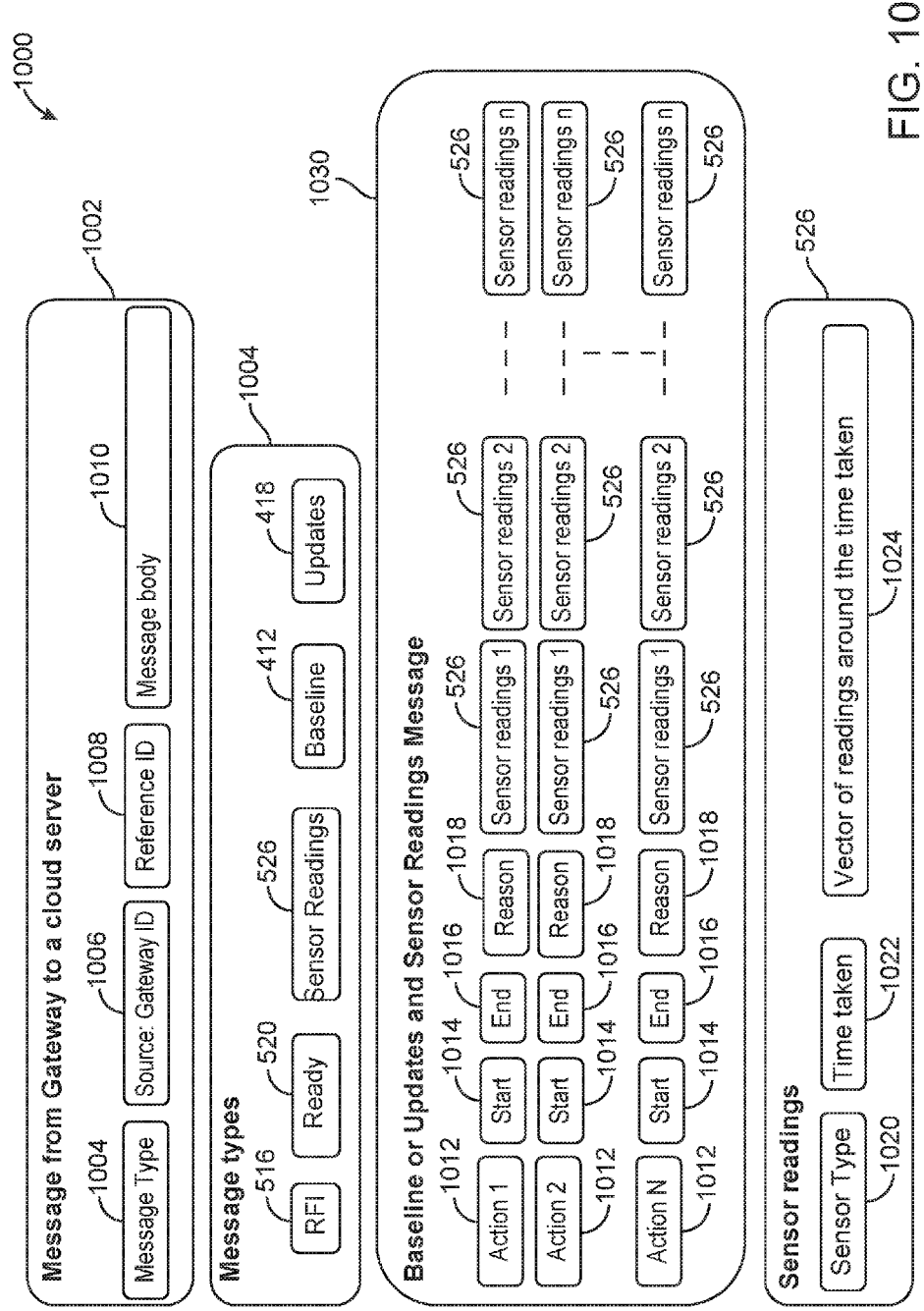
FIG. 10 illustrates a diagram of a message structure for messages delivered in the system from a gateway to cloud servers.

FIG. 10 illustrates an embodiment 1000 of a message structure for messages delivered from gateway 102 to cloud servers 106. In an embodiment, the message 1002 going to the cloud server is of a single structure. This structure may include Message type 1004, the sender gateway unique identification (Source: gateway ID) 1006, a unique Reference ID 1008 and the Message body 1010. According to an aspect, the Message type 1004 informs the receiver about the type of the message. The reference ID 1008 may be an internal number that is used when there is a conversation between the cloud servers and the gateway. The message body 1010 can be a baseline message or an updates message, and may be structured the same in both cases.

In an embodiment, 'Message types' 1004 is a 'Request for Information' (RFI) 516, which is sent upon initialization of the luminaire. A 'Ready' message 520 may be sent during initializations of the luminaire after discovering the dimming protocol, and when the gateway is ready for further instructions. According to an aspect, sensor readings message 526 is sent to the cloud servers during the initialization period. The 'Baseline' 412 and the 'Updates' 418 message types may be used when sending baseline or updates messages that are based on the cloud servers prior scheduled sensor readings by the specific gateway.

In an embodiment, the 'Baseline or Updates and Sensor Readings Message' 1030 is a 'Message body', which may be sent for the baseline 412, updates 418 and sensor readings 526 message types. According to an aspect, the message structure is the same. For every 'action' 1012, which may be a dimming level set, there is 'Start' 1014 which is the actual start time, 'End' 1016 which is the time the action was terminated, 'Reason' 1018 which is why the action terminated, and sensor readings for all sensors participating in the action as they were scheduled by the cloud server. In an embodiment, the 'Reason' 1018 is success or failure, which may occur for multiple reasons.

The sensor reading 526 part of the message may include a 'Sensor type' 1020 field to indicate the sensor reading, such as, for example, TEMP, ALS, and RGB. In an embodiment, the sensor reading 526 includes a 'Time taken' 1022 field to indicate when the sensor reading 526 was taken, and a 'Vector of readings' 1024, which includes multiple readings centered around the 'Time taken' 1022 field. In an embodiment, the number of readings can be based on the sensor type. According to an aspect, the number of readings is three, including shortly before the 'time taken' 1022 reading/field value, at the same time of the 'time taken' 1022 field value, and shortly after the 'time taken' 1022 field value.

Figure 11:
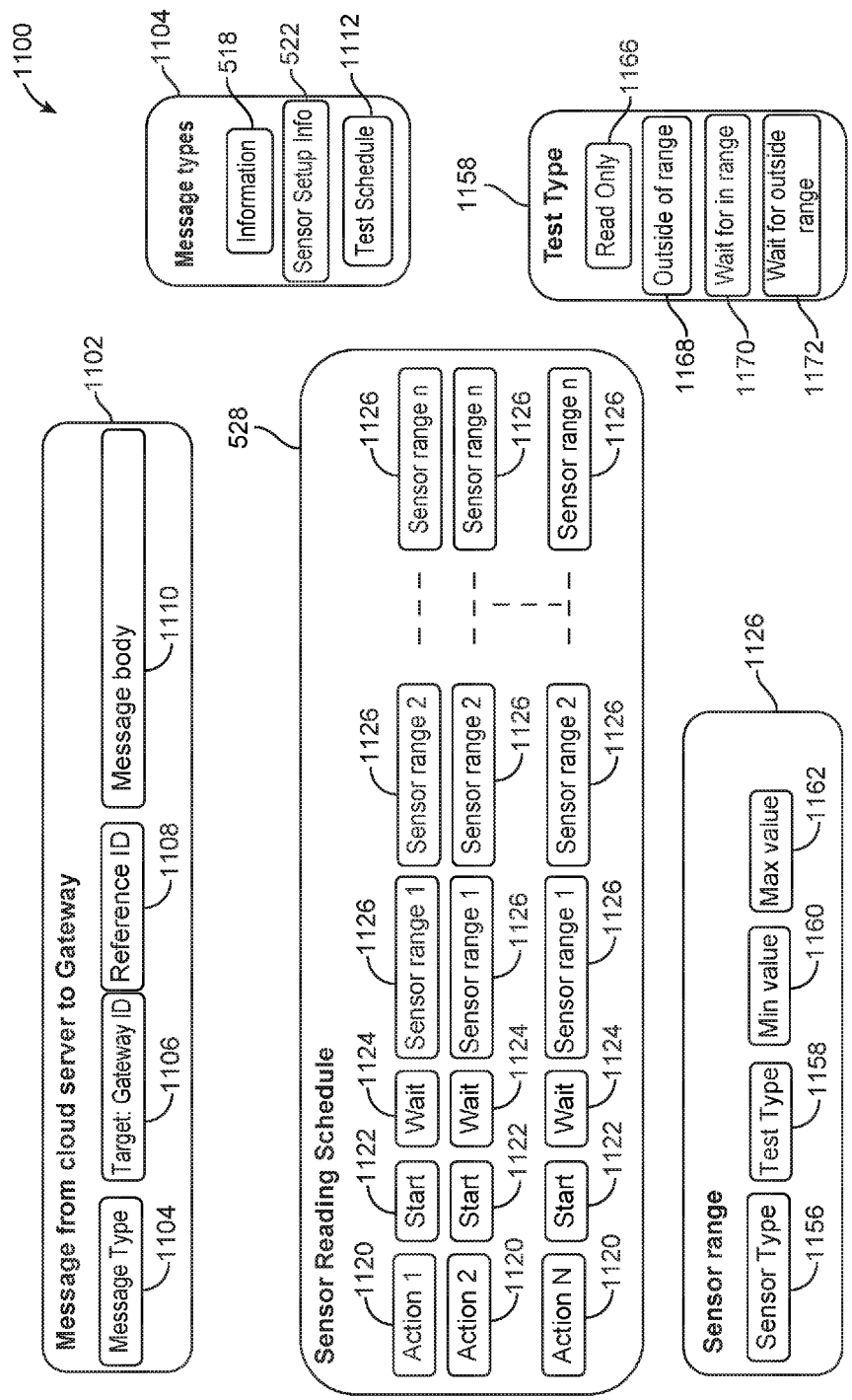
FIG. 11 illustrates a diagram of a message structure for messages delivered in the system from the cloud servers to the gateway.

FIG. 11 illustrates an embodiment 1100 of a message structure for messages delivered from the cloud server 106 to gateway 102. In an embodiment, the structure of the message 1102 is constant. This structure may include message types 1104, a target gateway unique identification 1106, a unique Reference ID 1108 and the message body 1110. According to an aspect, the message type 1104 lets a receiver know what type/kind of message it is. The reference ID 1108 may be an internal number that is used when there is a conversation/communication between the cloud server and the gateway. According to an aspect, the message body 1110 is a Sensor Reading Schedule 528.

In an embodiment, the Message types 1104 are 'Information' 518, 'Sensor Setup Info' 522 and 'Test Schedule' 1112. The 'Information' 518 and the 'Sensor Setup Info' 522 messages may provide the gateway with information about valid ranges for sensor readings at different dimming levels. According to an aspect, the Message body 1110 is a 'Sensor Reading Schedule' 528 that is a baseline for the gateway in its internal measurement and initialization cycle. The gateway may include a default setup, and this message can update this default.

In an embodiment, the 'Sensor Reading Schedule' 528 includes an 'Action' 1120 field, which is the dimming level. The 'Sensor Reading Schedule' 528 may include a 'Start' 1122 field, which is the start time for the test, and a 'Wait' 1124 field, which is the duration to wait before any measurement commences. The 'Sensor Reading Schedule' 528 may also include a list of sensors that participate in the measurements 1126. According to an aspect, the list of sensors is given as a list of Sensor ranges per sensor 1126.

In an embodiment, the Sensor range 1126 includes a 'Sensor Type' 1156 field, which identifies the sensor, and a 'Test Type' 1158 field, which informs the gateway how to run the test. The Sensor range 1126 may also include a 'Min Value' 1160 field and a 'Max Value' 1162 fields, which are configured to provide the valid range for the sensor in this test. According to an aspect, the 'Test Type' 1158 directs the gateway to handle different sensor values. When Test Type 1158 is 'Read Only' 1166 the value of the sensor may be retrieved regardless of range. When Test Type 1164 is 'Outside of Range' 1168 the value of the sensor must be outside of the range to be retrieved. In an embodiment, when the Test Type 1158 is 'Wait for in range' 1170 the gateway does not continue with other readings until the specific sensor is in given range. According to an aspect, when Test Type 1158 is 'Wait for outside range' 1172, the gateway will not continue to read sensor values until this sensor value is outside the given range.

Figure 12:
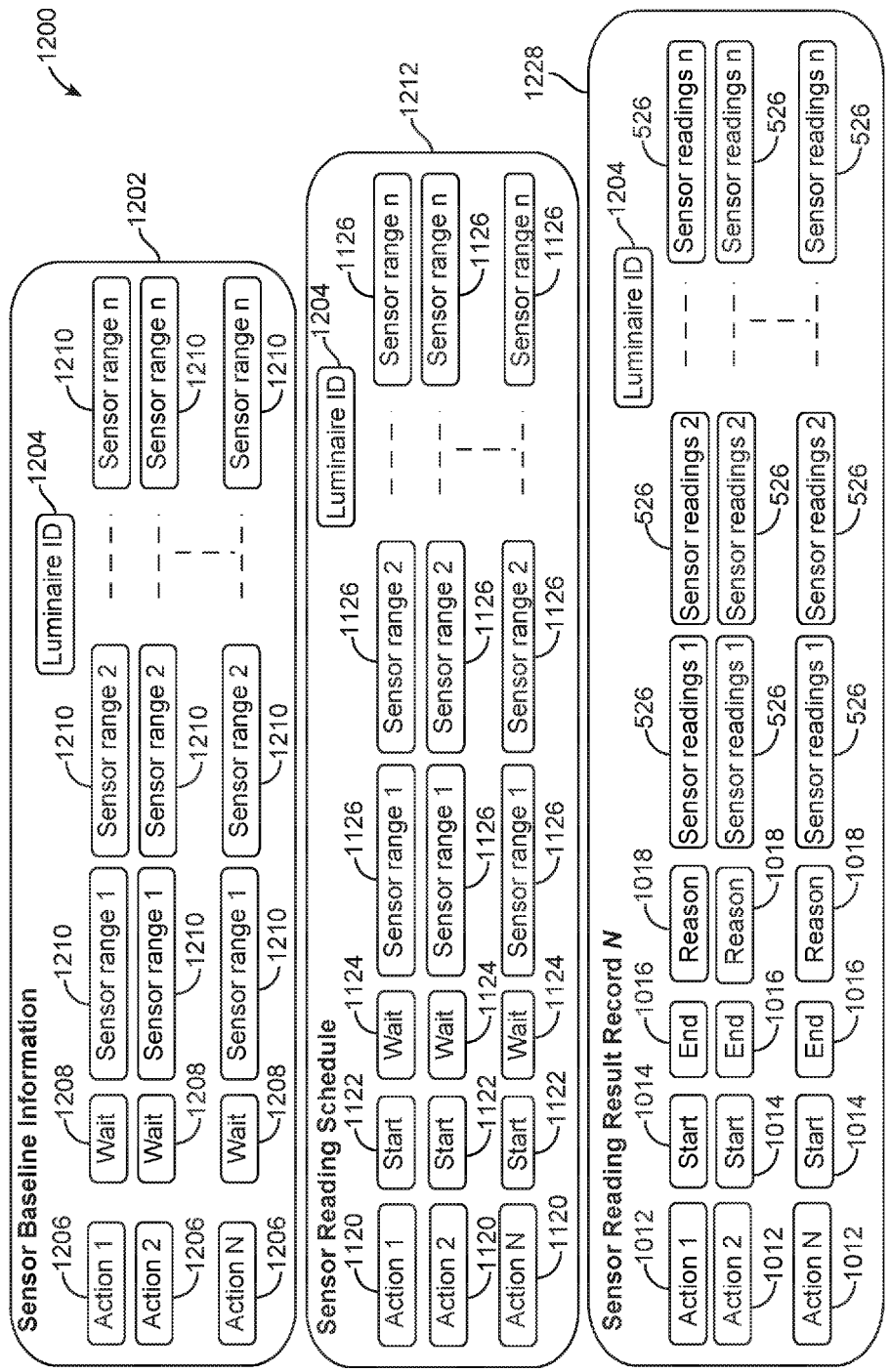
FIG. 12 illustrates a diagram of a luminaire database structure of a system.

FIG. 12 depicts an embodiment 1200 of the luminaire DB database structure. According to an aspect, the luminaire DB includes three types of records for every connected luminaire in the system. The records may include a Sensor Baseline Information 1202, a Sensor Reading Schedule 1212 and a Sensor Reading Result Record 1228. In an embodiment, each luminaire includes a single Sensor Baseline Information 1202 and a single Sensor Reading Schedule 1212 record. The Sensor Reading Result Record 1228 may be numbered between 1 and N. This type of record may be added for every reading result and may be being kept for as long as needed, e.g., N can be very large.

The Sensor Baseline Information 1202 may include sensor range information for all possible dimming levels that may be tested for this specific luminaire. Each dimming action field 1206 may include the minimal Wait time 1208, during which the gateway must wait before taking sensor measurements. Each dimming action field 1206 may include a list of Sensor range fields 1210, one list per sensor that needs to be monitored. According to an aspect, the Luminaire ID 1204 field identifies the luminaire that this record belongs to.

In an embodiment, the Sensor Reading Schedule 1212 record is identical to the Sensor Reading Schedule 528 (see FIG. 11), except for one additional field—the Luminaire ID 1204 field. The Luminaire ID 1204 field may be used to identify the luminaire that this record belongs to.

According to an aspect, the Sensor Reading Result Record 1228 is an accumulation of the Sensor Reading Message 1030 as described in FIG. 10, except for one additional field—the Luminaire ID 1204 field which is used to identify the luminaire that this record belongs to. In an embodiment, every time the cloud server receives a Sensor Reading Message 1030 that might be a Baseline message or an Updates message, the cloud server stores this message as a Sensor Reading Result Record 1228 for the specific luminaire.

Figure 13:
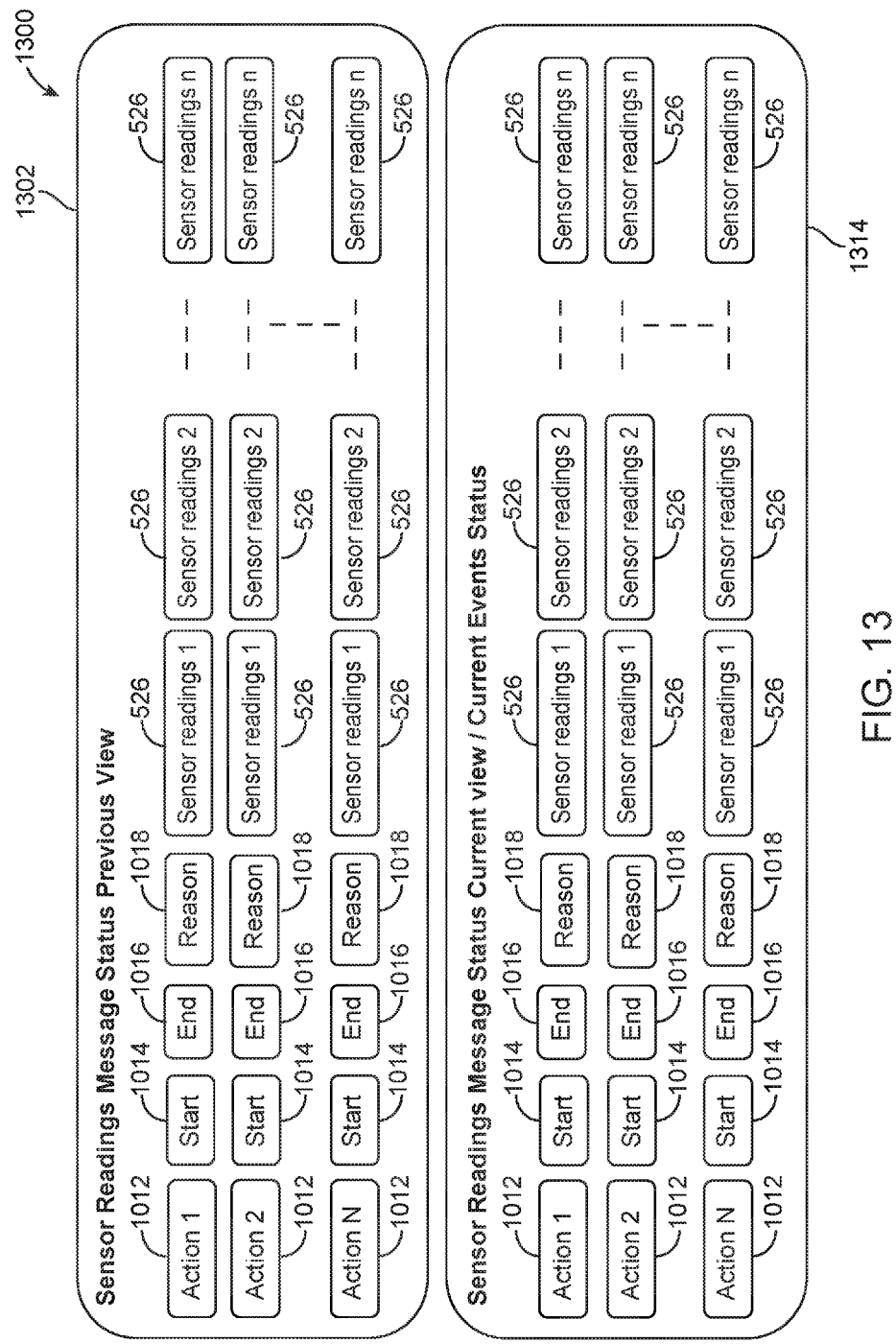
FIG. 13 illustrates a diagram of an events database and a message status database structure of a system.

FIG. 13 illustrates an embodiment 1300 of the Events Database 1302 and the Message Status Database 1314 in server 106. (Note: the data in Events Database 1302 can be mirrored in the database 612 in gateway 102 in FIG. 6. Similarly, the data in Message Status Database 1314 can be mirrored in database 618 in gateway 102 in FIG. 6). The Message Status DB 618 may be an accumulation of all sensor events associated with the reporting of scheduled test results. The Sensor Events DB 612 may be used to record events in real-time, such that the information is recorded into the appropriate structures for future messages to be generated. In an embodiment, the Message Status Database 618 contains two records as shown in FIG. 13. The first record may be a Sensor Readings Message Status Previous View 1302, and the second record may be a Sensor Readings Message Status Current View/Current Events Status 1314. According to an aspect, when reading events are triggered, the appropriate fields in the Readings Message Status Current View/Current Events Status 1314 record are being updated. When an Updates message is being sent or before a Baseline message is being sent, the content of the Sensor Readings Message Status Current View/Current Events Status 1314 may be copied into the Sensor Readings Message Status Previous View 1302. According to an aspect, when the Baseline message is being sent, the entire Sensor Readings Message Status Previous View 1302 record may be sent as is. The Sensor Readings Message Status Previous View 1302 and the Readings Message Status Current View/Current Events Status 1314 are described in further detail hereinabove, with reference to FIG. 10.

Figure 14:
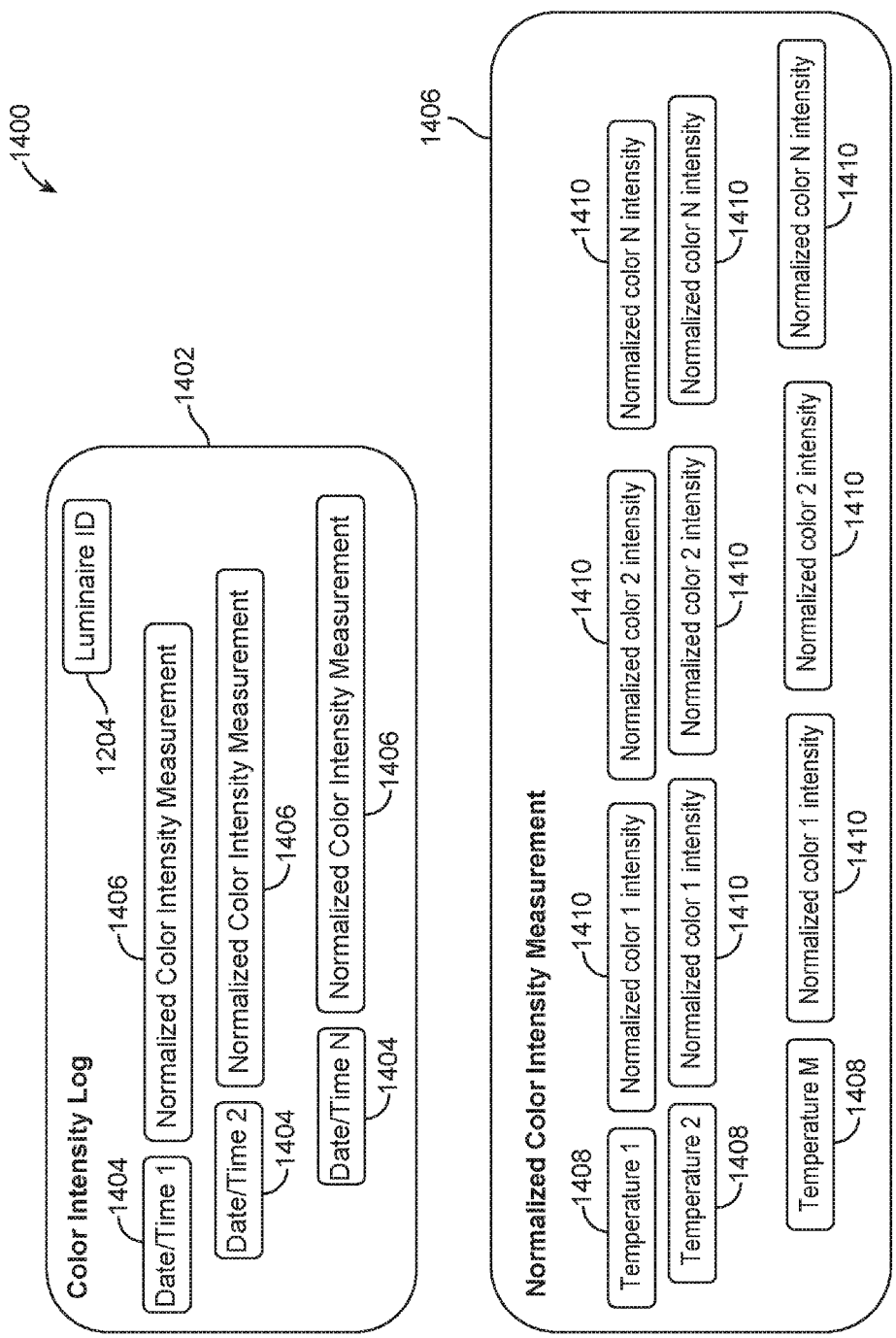
FIG. 14 illustrates a diagram of a luminaire half-life prediction database structure, according to an aspect.

FIG. 14 illustrates an embodiment 1400 of the Luminaire Half-Life Prediction Database structure (also seen in FIG. 8 as database 810). This Database may be a log for all Normalized Color Intensity Measurements per luminaire in the system. According to an aspect, each Color Intensity Log 1402 record (one per luminaire) includes the Luminaire ID 1204 field to uniquely identify the luminaire that this record belongs to. The Color Intensity Log 1402 record may be composed of N Normalized Color Intensity Measurement 1406 records one per Date/Time in which this measurement was received. In an embodiment, the Normalized Color Intensity Measurement 1406 record is composed of a list of Temperature fields 1420. The Temperature field 1420 may include the temperature in which a measurement was taken and a list of normalized color intensity measurements 1422, one per color being measured in this system.

Figure 15:
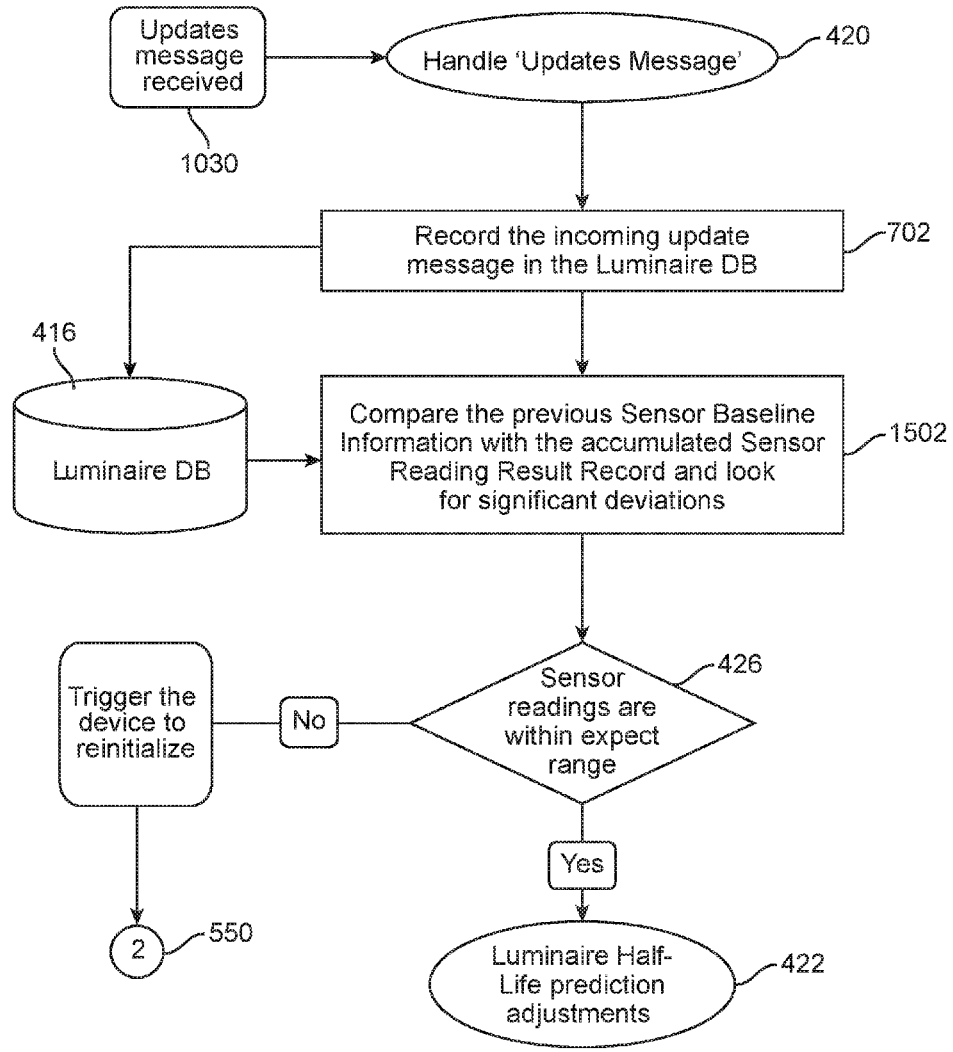
FIG. 15 illustrates a flow chart of a system including cloud servers handling an updates message.

FIG. 15 illustrates an embodiment 1500 in which the server handles an 'updates message' 1030 at step 420. At step 702, after receiving an 'updates message' 1030 the server stores the updates in the 'Luminaire Database' 416. At step 1502 the server checks the receive data and the accumulated prior 'Updates Message' to create a current state view of the luminaire. With the knowledge of the current state, the cloud server compares the current state and sensor readings with previous known state. In step 424 the server makes a decision how to proceed. When the accumulated readings are within expecting range, the cloud server continues with normal operations and move to step 422 (see FIG. 4) to adjust the luminaire half-life prediction based on the latest sensor measured inputs. At step 424, in case were the newly arrive information is outside the expert range of readings, the cloud server will trigger the gateway to start an initialization process which will tune-up the sensor readings (i.e.: adjust the new baseline measurements coming from the new initialization process results) back into normal ranges with the assumption that sensor repositioning caused the anomaly in the readings.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for sensing luminaire properties and controlling a luminaire performance based on sensor readings of the luminaire, wherein the sensor readings are taken without regard to the location, distance or orientation of the sensor relative to the luminaire, comprising:
a dimming control configured to control the dimming of a luminaire;
at least one sensor configured to take a sensor reading of the luminaire;
a gateway configured to receive sensor readings from the at least one sensor, and to control operation of the dimming control in accordance with an expected luminaire lifetime prediction relationship; and
a cloud server configured to control operation of the gateway, wherein
the at least one sensor sends periodic sensor readings to the gateway, and
the gateway sends sensor readings to the cloud server when the sensor readings are outside of sensor ranges expected by the gateway, and
the cloud server compares the sensor readings received from the gateway to the expected luminaire lifetime prediction relationship to determine whether the at least one sensor needs to be recalibrated.

2. The system of claim 1, wherein the gateway continuously adjusts the dimming level of the luminaire over time based upon the luminaire lifetime prediction relationship generated by the cloud server.

3. The system of claim 2, wherein a new luminaire lifetime prediction relationship is generated for the gateway by the cloud server when the cloud server receives the sensor readings that are outside of the expected sensor ranges.

4. The system of claim 1, wherein the gateway continuously adjusts the luminaire over time to maintain a color temperature of the luminaire.

5. The system of claim 1, wherein the expected sensor ranges are continuously updated by the server.

6. The system of claim 1, wherein the identification of the luminaire is done in the server and not in the gateway or sensor.

7. The system of claim 1, wherein the cloud server recalibrates the at least one sensor when the cloud server determines that the luminaire has been replaced.

8. The system of claim 7, wherein the cloud server determines that the luminaire has been replaced by detecting an increase in brightness of the luminaire over a period of time.

9. The system of claim 1, wherein the cloud server recalibrates the at least one sensor when the cloud server determines that the at least one sensor has been moved with respect to the luminaire.

10. The system of claim 1, further comprising:
a power meter for measuring the power used by the luminaire, and for transmitting luminaire power measurements to the gateway.

11. The system of claim 10, wherein each of the measurements comprise:
(i) a baseline message set, and
(ii) an updates message set.

12. The system of claim 11, wherein the updates message is sent to the gateway at regular intervals and the baseline message is sent to the gateway at major status changes.

13. The system of claim 1, wherein the luminaire lifetime prediction relationship generated by the cloud server is generated by comparing a manufacturers' theoretical lumen degradation prediction graph to measurements taken by the at least one sensor.

14. A system for sensing properties of a device and controlling a performance of the device based on sensor readings of the device, wherein the sensor readings are taken without regard to the location, distance or orientation of the sensor relative to the device, comprising:
a controller configured to control operation of the device;
at least one sensor configured to take a sensor reading of the device;
a gateway configured to receive sensor readings from the at least one sensor, and to control operation of the controller in accordance with an expected lifetime prediction relationship; and
a cloud server configured to control operation of the gateway, wherein
the at least one sensor sends periodic sensor readings to the gateway, and
the gateway sends sensor readings to the cloud server when the sensor readings are outside of sensor ranges expected by the gateway, and
the cloud server compares the sensor readings received from the gateway to the expected lifetime prediction relationship to determine whether the at least one sensor needs to be recalibrated.

15. The system of claim 14, wherein the gateway continuously adjusts operation of the device over time based upon the lifetime prediction relationship generated by the cloud server.

16. The system of claim 14, wherein the cloud server recalibrates the at least one sensor when the cloud server determines that the device has been replaced or that the at least one sensor has been moved with respect to the device.

17. A system for sensing properties of a device and controlling a performance of the device based on sensor readings of the device, wherein the sensor readings are taken without regard to the location, distance or orientation of the sensor relative to the device, comprising:
a controller configured to control operation of the device;
a dimming control configured to control the dimming of a luminaire;
at least one sensor configured to take a sensor reading of the luminaire;
a gateway configured to receive sensor readings from the at least one sensor, and to control operation of the dimming control in accordance with an expected luminaire lifetime prediction relationship; and
a cloud server configured to control operation of the gateway, wherein
the at least one sensor sends periodic sensor readings to the gateway, and
the gateway sends sensor readings to the cloud server when the sensor readings are outside of sensor ranges expected by the gateway, and
the cloud server compares the sensor readings received from the gateway to the expected luminaire lifetime prediction relationship to determine whether the at least one sensor needs to be recalibrated.

18. The system of claim 17, wherein the cloud server recalibrates the at least one sensor when the cloud server detects an increase in brightness of the luminaire over a period of time.

19. The system of claim 17, wherein the cloud server recalibrates the at least one sensor when the cloud server determines that the at least one sensor has been moved with respect to the luminaire.

20. The system of claim 17, wherein the gateway continuously adjusts at least one of:
the dimming level of the luminaire over time based upon the luminaire lifetime prediction relationship generated by the cloud server; and
the luminaire over time to maintain a color temperature of the luminaire.

* * * * *